US008960256B2

(12) United States Patent
Wagner et al.

(10) Patent No.: US 8,960,256 B2
(45) Date of Patent: Feb. 24, 2015

(54) MANUAL OVERRIDE SYSTEM FOR MOTOR-DRIVEN RETRACTABLE AWNING

(75) Inventors: Robert Wagner, Longmont, CO (US); Scott P. Thompson, Boulder, CO (US)

(73) Assignee: Carefree/Scott Fetzer Company, Broomfield, CO (US)

( * ) Notice: Subject to any disclaimer, the term of this patent is extended or adjusted under 35 U.S.C. 154(b) by 1098 days.

(21) Appl. No.: 12/625,431

(22) Filed: Nov. 24, 2009

(65) Prior Publication Data

US 2010/0126544 A1 May 27, 2010

Related U.S. Application Data

(60) Provisional application No. 61/118,113, filed on Nov. 26, 2008.

(51) Int. Cl.
*E04F 10/06* (2006.01)
*E06B 9/74* (2006.01)
*F16D 41/064* (2006.01)
*E06B 9/70* (2006.01)
*E06B 9/72* (2006.01)

(52) U.S. Cl.
CPC ......... *E04F 10/0648* (2013.01); *E04F 10/0618* (2013.01); *E06B 9/74* (2013.01); *F16D 41/064* (2013.01); *E04F 10/0651* (2013.01); *E04F 10/0662* (2013.01); *E04F 10/0688* (2013.01); *E06B 9/70* (2013.01); *E06B 9/72* (2013.01); *F16D 2041/0646* (2013.01)
USPC .............................................. 160/66; 160/70

(58) Field of Classification Search
USPC .............. 160/297, 309, 312, 66, 70; 242/253, 242/391, 394.1, 394, 395, 395.1
See application file for complete search history.

(56) References Cited

U.S. PATENT DOCUMENTS

| 1,605,150 | A | * | 11/1926 | Van Hatten | 160/7 |
| 2,232,090 | A | | 2/1941 | Anderson | |
| 4,236,619 | A | * | 12/1980 | Kuroda | 192/45.016 |
| 4,519,434 | A | * | 5/1985 | Forquer | 160/133 |
| 6,216,762 | B1 | | 4/2001 | Lin | |
| 6,957,679 | B2 | * | 10/2005 | Powell et al. | 160/64 |
| 7,152,652 | B2 | * | 12/2006 | Heitel | 160/5 |

(Continued)

FOREIGN PATENT DOCUMENTS

| EP | 1254997 A2 | 11/2002 |
| EP | 1254997 A3 | 1/2004 |

(Continued)

OTHER PUBLICATIONS

"European Patent Office Search report", European search report dated Nov. 18, 2013 for Application No. 09177042.0.

*Primary Examiner* — Katherine Mitchell
*Assistant Examiner* — Jeremy Ramsey
(74) *Attorney, Agent, or Firm* — Dorsey & Whitney LLP

(57) ABSTRACT

A retractable motor-driven awning can be extended or retracted by energizing the motor in one direction or another. A manually operable system, however, is also employed for rotating the awning by hand in a direction to retract the awning in the event the motor drive becomes inoperable. The ability to hand rotate the roll bar to retract the awning is achieved by connecting the roll bar to the drive shaft of the motor with a manual override system. Implementations of a manual override mechanism include one-way bearings and various ratchet designs.

34 Claims, 18 Drawing Sheets

(56) References Cited

U.S. PATENT DOCUMENTS

2008/0202708 A1* 8/2008 Opendo ..................... 160/310
2009/0019797 A1* 1/2009 Gunn ........................... 52/202

FOREIGN PATENT DOCUMENTS

GB          2118739 A     11/1983
JP          07305467 A    11/1995

* cited by examiner

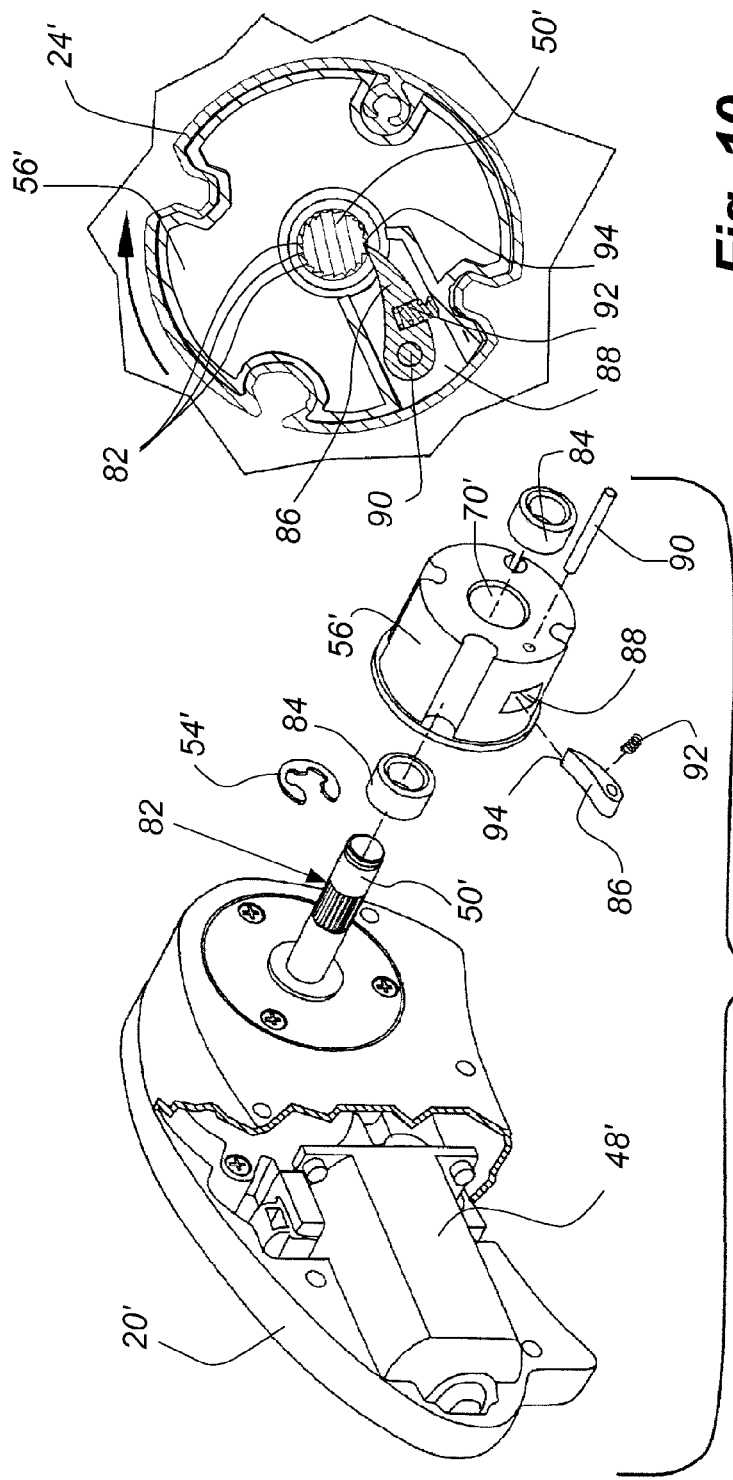

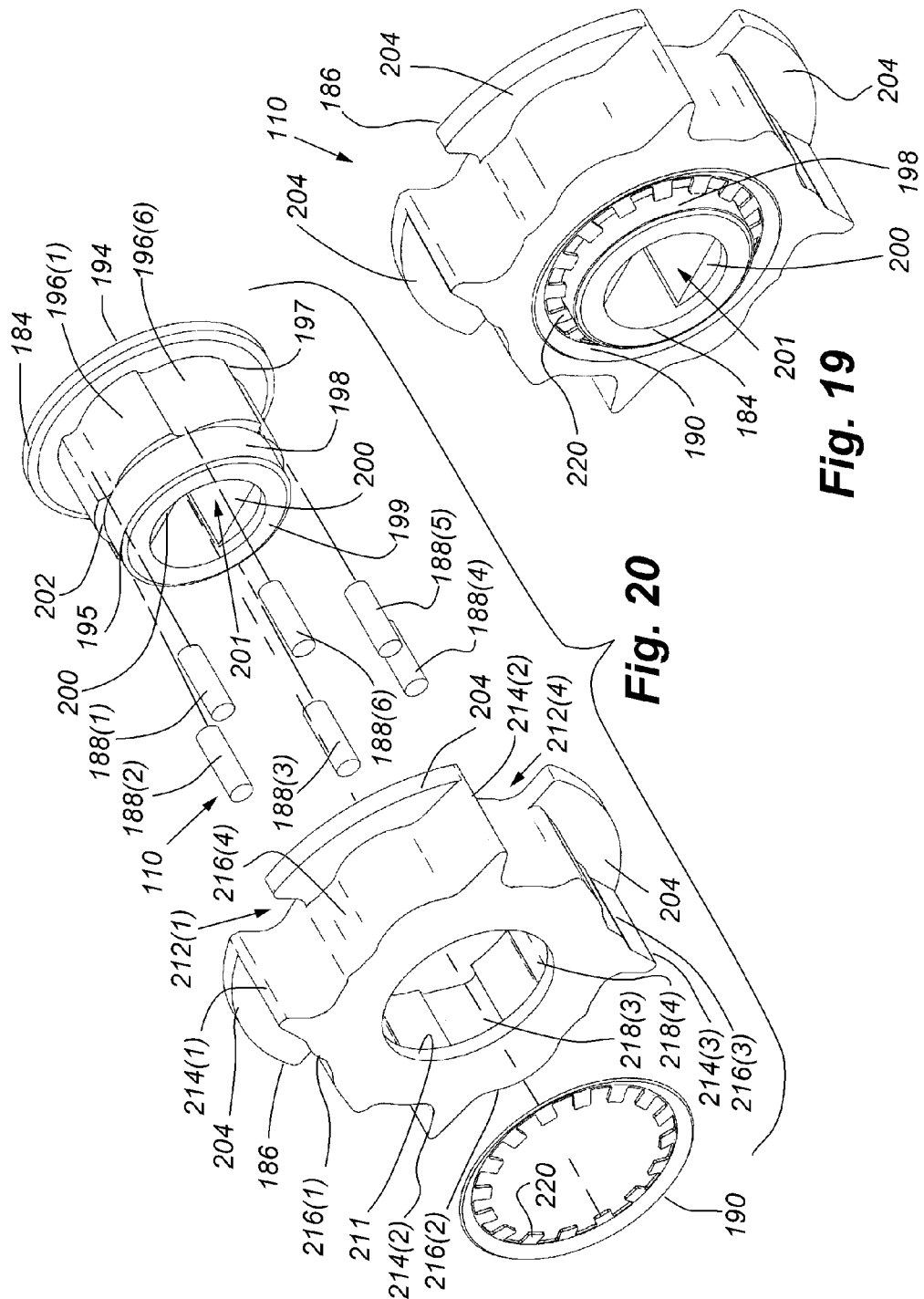

MANUAL OVERRIDE SYSTEM FOR MOTOR-DRIVEN RETRACTABLE AWNING

CROSS-REFERENCE TO RELATED APPLICATIONS

This application claims the benefit of priority pursuant to 35 U.S.C. §119(e) of U.S. provisional application No. 61/118,113 filed 26 Nov. 2008 entitled "Motor-driven retractable awning with manual override," which is hereby incorporated herein by reference in its entirety.

BACKGROUND

1. Technical Field

In retractable awnings and, more particularly, motor-driven retractable awnings, spring-biased support arms for the awning bias the awning toward an extended position. Reversible motor drives for the awnings permit the spring-bias support arms to extend the awnings, or, when the motor is driven in an opposite direction, retract the awnings against the bias of the support arms. As disclosed herein, in the event the motor drive becomes inoperable, a manual override permits the awnings to be retracted with, for example, a ratchet wrench.

2. Description of the Relevant Art

Awnings for covering windows, doorways, or the like, have been in common use for many years with most awnings being of the hand-cranked type so they can be extended or retracted manually with the use of a crank handle. More recently, motor-driven awnings have become desirable wherein a reversible motor extends or retracts the awning as desired. One problem with motor-driven awnings resides in the fact that motors sometimes become inoperable while the awning is extended, and it is therefore necessary to leave the awning extended until the motor can be fixed. This becomes a particular problem when the awning is mounted on the side of a recreational vehicle or the like inasmuch as the vehicle cannot be operated when the awning is extended thereby immobilizing the vehicle and its operator. Further, if the awning is extended and cannot be furled, the awning or components thereof could suffer significant damage due to severe wind or other inclement weather conditions.

Some prior designs have attempted to address this concern by using a planetary gear system between the motor output and a shaft driving the awning. A planetary gear generally has three points of rotation about a common axis, one point corresponding to a center sun gear, one point corresponding to an outer ring gear, and one point corresponding to the rotation of an intermediate planetary carrier with multiple pinion gears that have individual offset axes as well. In operation, one of the points is generally restrained to create the desired drive output ratio. In the planetary gear configuration used for the awning applications, the motor is attached to a first point of rotation, the manual crank is attached to a second point of rotation, and the output shaft is attached to a third point of rotation. Therefore, if the manual crank is rotated, the motor is not and is therefore the fixed point. Likewise, if the motor is rotated, then the manual crank is not and is therefore the fixed point. Incorporation of a planetary gear system into an awning control adds cost and weight to the awning in the form of the planetary gear set, a manual crank gearbox, and a manual crank handle to operate the awning manually. It also increases the length of the awning box without increasing the canopy coverage. Powered awning models with the planetary gear system are not popular currently due to the cost and weight penalty of the current designs.

The information included in this Background section of the specification, including any references cited herein and any description or discussion thereof, is included for technical reference purposes only and is not to be regarded subject matter by which the scope of the invention is to be bound.

SUMMARY

Retractable awnings typically include a roll bar that is rotatably mounted on a support surface and anchored to an inner edge of a flexible awning canopy that can be wrapped around the roll bar when the awning is retracted or unwrapped from the roll bar when the awning is extended. Such awnings typically include a lead bar that is supported with extendible support arms in parallel relationship with the roll bar and to which the opposite or outer edge of the awning canopy is connected. The support arms typically include a biasing system urging the awning toward its extended position.

Motor-driven retractable awnings of the aforenoted type typically include a reversible motor operably connected to the roll bar so that the drive shaft of the motor is keyed to the roll bar to rotate the roll bar in unison with the drive shaft. Accordingly, when the motor is driven in one direction, the roll bar is rotated in that same direction to wrap the awning canopy therearound pulling the lead bar toward the roll bar against the built-in bias of the support arms. When the motor is driven in the opposite direction, the roll bar rotates in the opposite direction and the bias on the support arms urges the lead bar away from the roll bar thereby retaining a taut condition in the awning canopy as the motor allows the canopy to unroll from the roll bar.

In implementations disclosed herein, rather than having the drive shaft of the motor keyed to the roll bar for unitary rotation therewith, one-way bearings or ratchet systems are utilized which permit the motor to extend or retract the awning depending upon the direction of rotation of the motor drive shaft. In the event the motor becomes inoperable and the awning canopy cannot be retracted with the motor, an independent, manually-operable system is provided so that the awning can be manually moved into its retracted position. The manually operable system may use a ratchet-type drive member to rotate a hub keyed to the roll bar in a direction to retract the awning while bypassing the drive shaft of the motor. The override mechanism allows the convenience of an electric awning at a lower cost and lighter weight than those currently offered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

FIG. 9 is an exploded fragmentary isometric view of the left end of the awning showing an alternative embodiment.

FIG. 10 is a fragmentary vertical section view through the embodiment of the invention shown in FIG. 9.

FIG. 19 is an isometric view of the gravity ratchet of the awning of FIG. 11.

FIG. 20 is an exploded left-front isometric view of the components of the gravity ratchet of FIG. 19.

DETAILED DESCRIPTION

Figure 1:
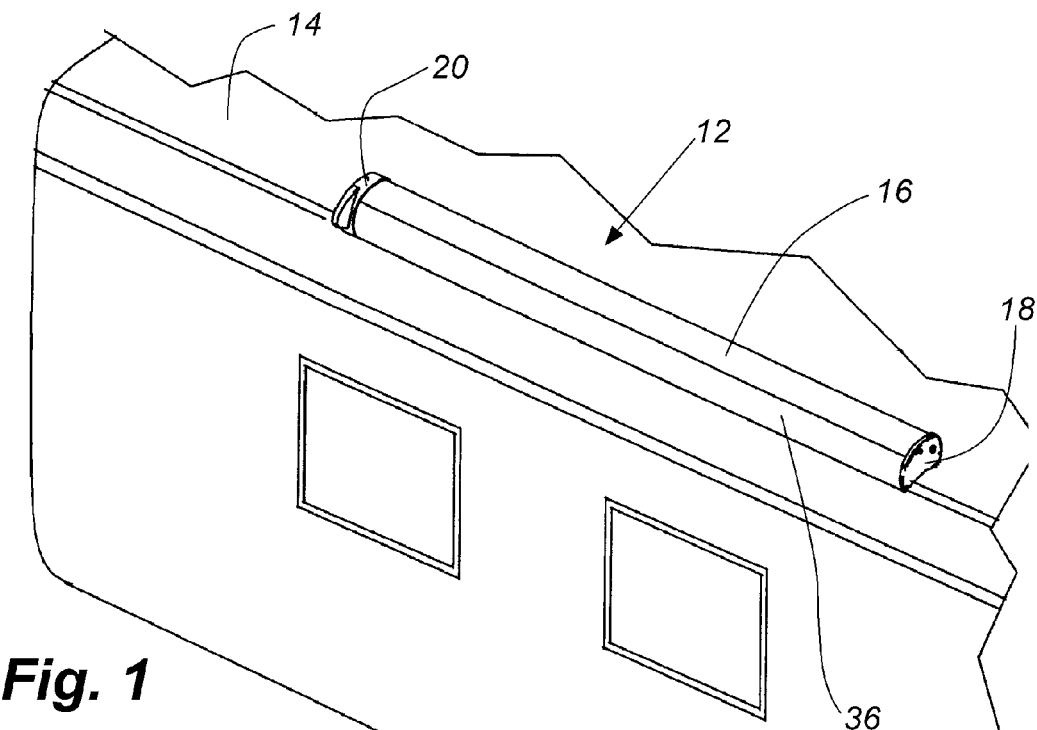
FIG. 1 is a fragmentary isometric view of an implementation of an awning mounted on a support surface with the awning in a retracted position.

Referring first to FIG. 1, an awning 12 is shown mounted on a support surface 14 with that support surface 14 being the top of a recreational vehicle. The support surface 14 could be a vertical wall or, as illustrated in FIG. 1, a top wall with the particular way of mounting the awning 12 not being of importance to the present discussion.

As will also be appreciated with the description that follows, the particular awning 12 disclosed having an implementation of a manual override system, may be of many different types with it only being necessary that the awning 12 is retractable and utilizes a reversible motor for rotating a roll bar in opposite directions around which an awning canopy can be wrapped or unwrapped. Accordingly, while a particular awning 12 will be described hereafter for purposes of illustration, it should be noted the features of the awning 12, apart from the ability of the awning 12 to be manually retracted, are included for illustrative purposes only.

Referring initially to FIGS. 1-5B, the awning 12 as illustrated can be seen to include a housing 16 having a right 18 and left 20 end cap and with the housing 16 being supported on the support surface 14 with brackets 22 so it is fixed in position and is substantially horizontally oriented. Within the housing 16, a roll bar 24 is horizontally disposed and rotatably mounted at opposite ends on the end caps. The roll bar 24, as possibly best seen in FIG. 5A, is of generally cylindrical configuration but having inwardly-directed, longitudinally-extending protrusions 26 which define outwardly opening grooves 28 in the surface of the roll bar 24.

One of the outwardly-opening grooves 28 is adapted for securing in a conventional manner an inner edge 30 of an awning canopy 32 which is typically made of a flexible fabric material. The outer edge 34 of the fabric material is secured in any suitable manner to a lead bar 36 which is a rigid bar that may be complimentary with the housing 16 to close an opening 38 in the side of the housing 16 when the awning 12 is fully retracted as shown, for example, in FIG. 1.

The lead bar 36 is supported from the housing 16 with a pair of support arms 40 having inner arms 42 and outer arms 44 that are pivotally interconnected with elbow joints 46. The support arms 40 carry a spring-biasing system (not shown) which bias the support arms 40 toward the extended position of FIG. 2 even though they can be retracted against the bias of the springs so that the inner and outer arms 42, 44 of each support arm 40 lie in closely adjacent parallel relationship when the awning 12 is retracted as shown in FIG. 1. The spring bias in the support arms 40 therefore biases the awning 12 toward the extended position of FIG. 2. The awning 12, as described above, is fairly common and it is into such an awning 12 that the manually retractable features described herein are incorporated.

Figure 5A:
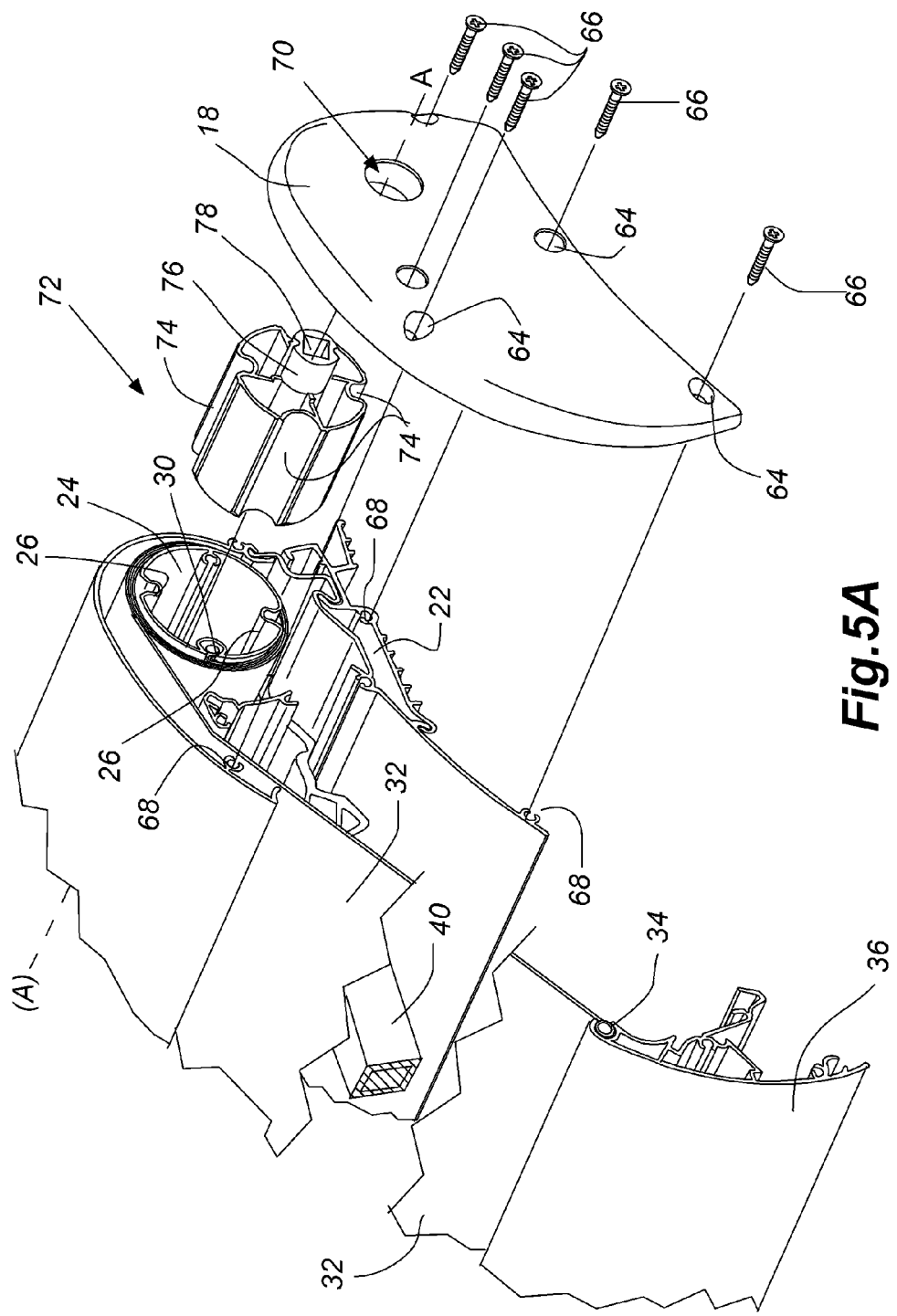
FIG. 5A is an exploded fragmentary isometric view showing the right end of the awning.
Figure 5B:
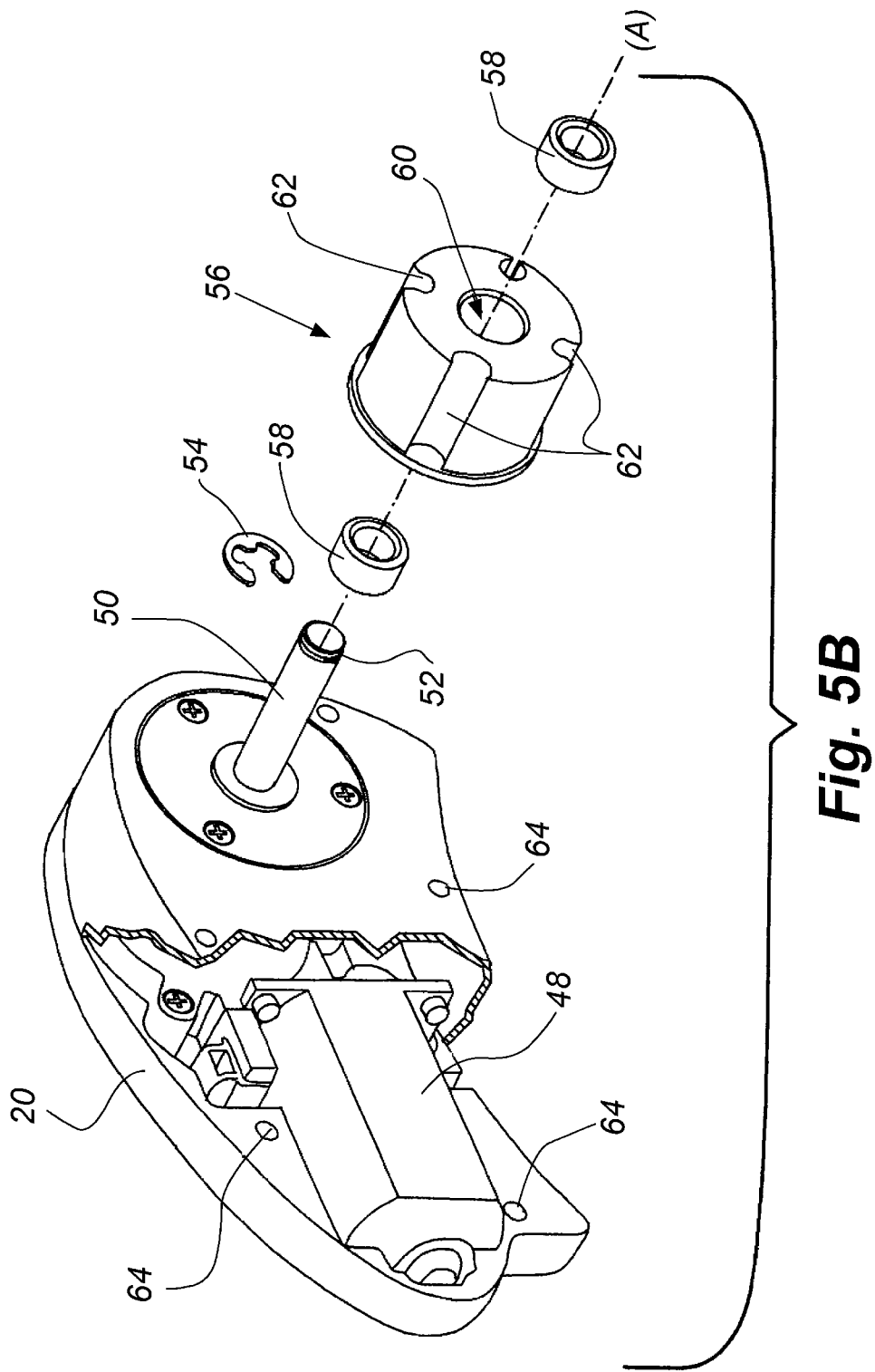
FIG. 5B is an exploded fragmentary isometric view showing the left end of the awning.

Referring to FIG. 5B, a reversible motor 48 is mounted on the left end cap 20 with the motor 48 having a horizontally extending drive shaft 50 that is coaxial with an axis A as seen in FIG. 5A. The drive shaft 50 extends only a short distance along axis A toward the right end of the awning 12 and has an annular groove 52 provided in its distal end for receipt of a C-clip 54 adapted to hold a left end roll bar support 56 along with a pair of one-way bearings 58 on the drive shaft 50. The left end roll bar support 56 is generally cylindrical in configuration having an axial cylindrical passage 60 therethrough into which the one-way bearings 58 are press fit at opposite ends of the support 56. The drive shaft 50 of the motor 48 fits within the center of the casings of the one-way bearings 58. The assemblage of the left end roll bar support 56 and one-way bearings 58 are held on the drive shaft 50 with the C-clip 54. This assemblage functions as a manual override mechanism. The left end roll bar support 56 can also be seen to have longitudinally-extending grooves 62 in its outer surface which slidably receive the inwardly directed protrusions 26 of the roll bar 24 so that the roll bar 24 can be seated on the left end roll bar support 56 and supported thereon while being keyed for unitary rotation therewith.

This assemblage of the left end roll bar support 56 and one-way bearings 58 functions as a manual override mechanism. It will be appreciated from the above that the left end roll bar support 56 is freely rotatable in one direction relative to the drive shaft 50 of the motor 48, but will rotate in unison with the drive shaft 50 in the opposite direction due to the operative characteristics of the one-way bearings 58. As will become more clear with the description of the operation of the awning 12 later, the left end roll bar support 56 can rotate freely relative to the drive shaft 50 in a clockwise direction, as viewed in FIG. 5B, but will only rotate in unison with the drive shaft 50 in a counterclockwise direction.

Referring to FIG. 5A, the right end cap 18 for the housing 16 is shown along with the housing 16 and a mounting bracket 22. An inner end of one of the support arms 40 is also shown and, while it is not illustrated, the support arms 40 are pivotal relative to the housing 16 so they can be pivoted between a folded position when the awning 12 is retracted and the extended position of FIG. 2 when the awning 12 is extended. The end cap 18 at the right end (which is also true of the end cap at the left end) has a plurality of openings 64 for receipt of screw-type fasteners 66, which can be threaded into longitudinally-extending channels 68 in the housing 16 so that the end caps 18, 20 at each end of the awning 16 can be secured to the housing 16. The right end cap 18 also has a relatively large cylindrical passage 70 therethrough that serves as a bearing support for a right end or manual drive roll bar support 72. The manual drive roll bar support 72, which is positioned at the right end of the awning 12, is generally cylindrical in nature having circumferentially-spaced, longitudinally-extending, outwardly-opening channels 74 formed therein which are adapted to receive corresponding inwardly directed protrusions 26 of the roll bar 24.

Figure 3:
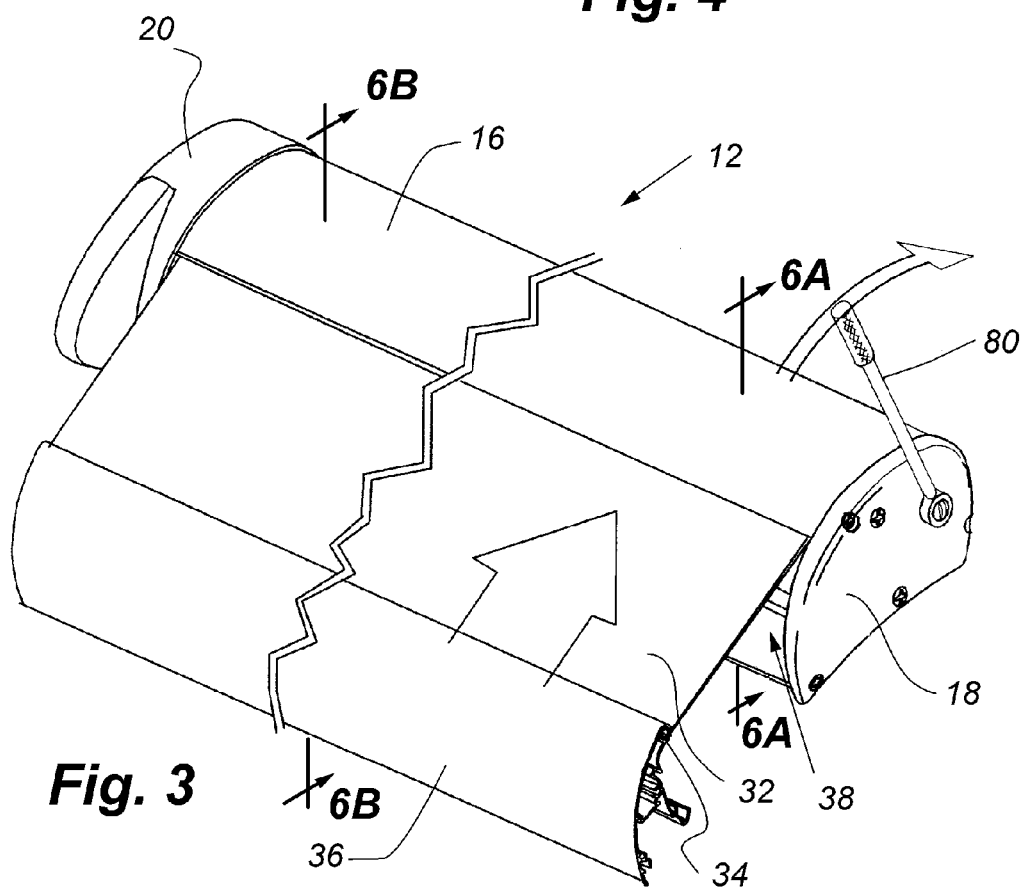
FIG. 3 is a fragmentary isometric view looking at the right end of the awning which has been partially retracted and illustrating a ratchet wrench for manually retracting the awning.

Accordingly, the right end roll bar support 72 at the right end is keyed to the roll bar 24 when the roll bar support 72 is inserted into the open end of the roll bar 24 so that the right end roll bar support 72 rotates in unison with the roll bar 24. The right end roll bar support 72 also has a relatively small cylindrical projection 76 adapted to extend through the cylindrical passage 70 through the right end cap 18 so that the projection 76 is rotatably seated within the passage 70. The projection 76 also has a square, axially-extending recess 78 opening through its distal end to releasably receive, for example, a square drive shaft of a ratchet wrench 80 (FIG. 3). It will therefore be appreciated when the right end roll bar support 72 is positioned within the open end of the roll bar 24 and the cylindrical projection 76 is supported in the passage 70 through the right end cap 18, a ratchet wrench 80 can be inserted into the square axial recess 78 in the right end roll bar support 72 to rotate the right end support 72 as well as the roll bar 24 which is keyed thereto.

Figure 6A:
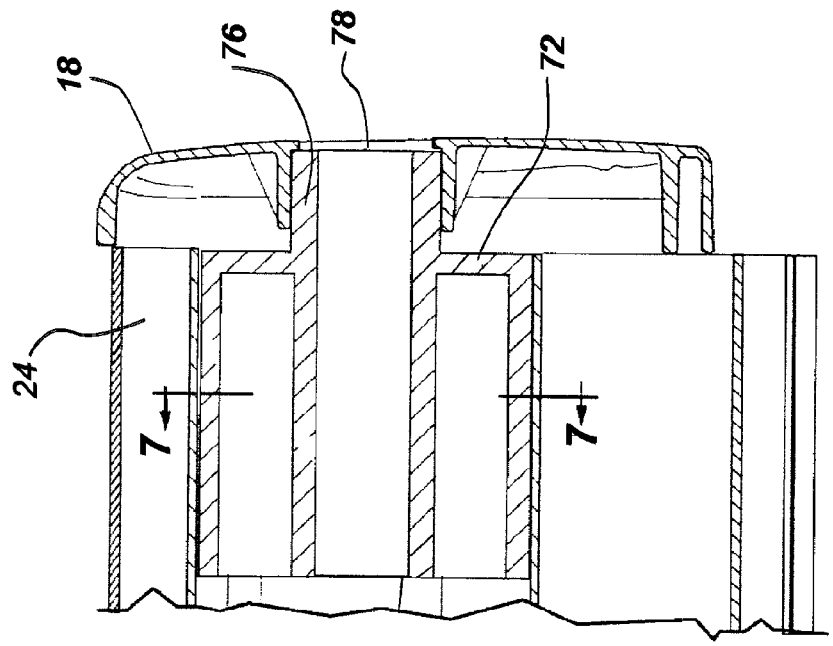
FIG. 6A is a fragmentary vertical section view taken along line 6A-6A of FIG. 3 through the right end of the awning.
Figure 6B:
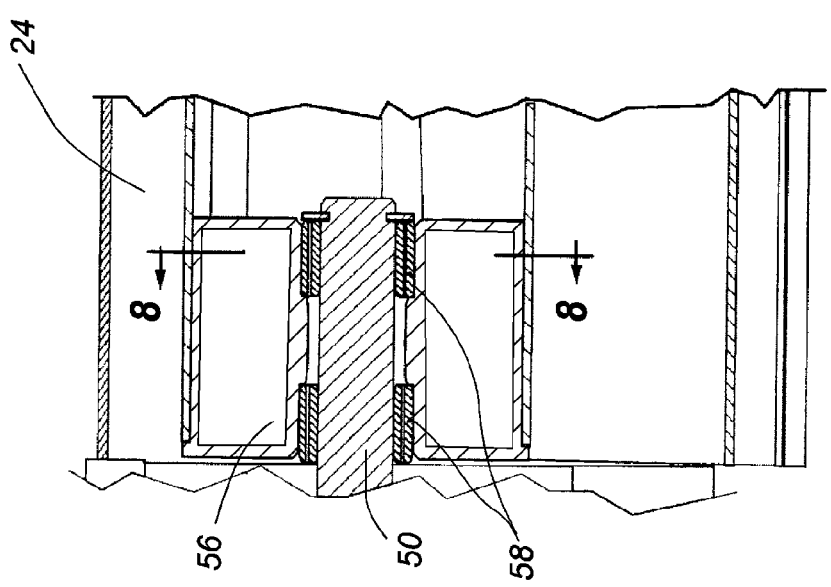
FIG. 6B is a fragmentary vertical section view taken along line 6B-6B of FIG. 3 through the left end of the awning.
Figure 7:
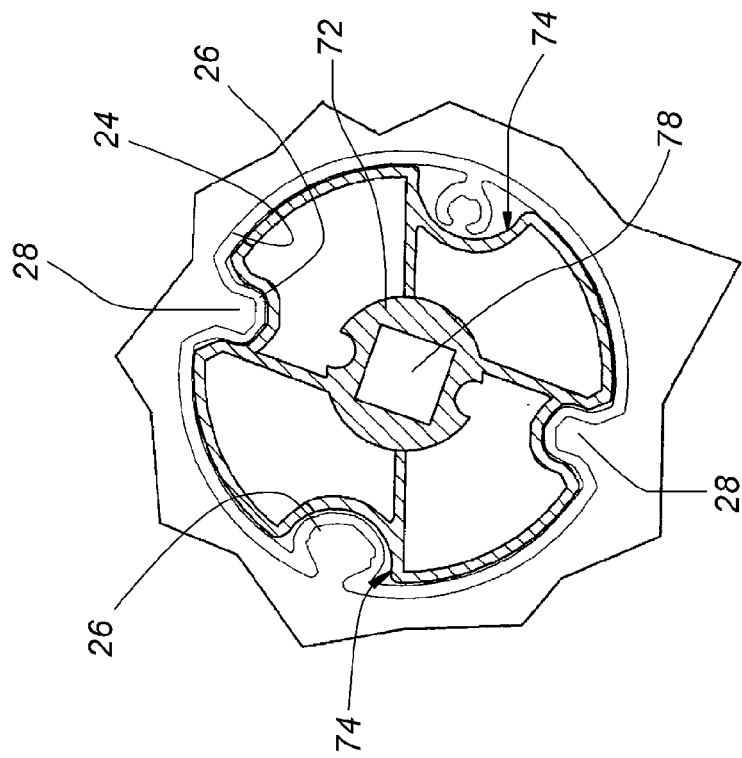
FIG. 7 is a cross-section view taken along line 7-7 of FIG. 6A.
Figure 8:
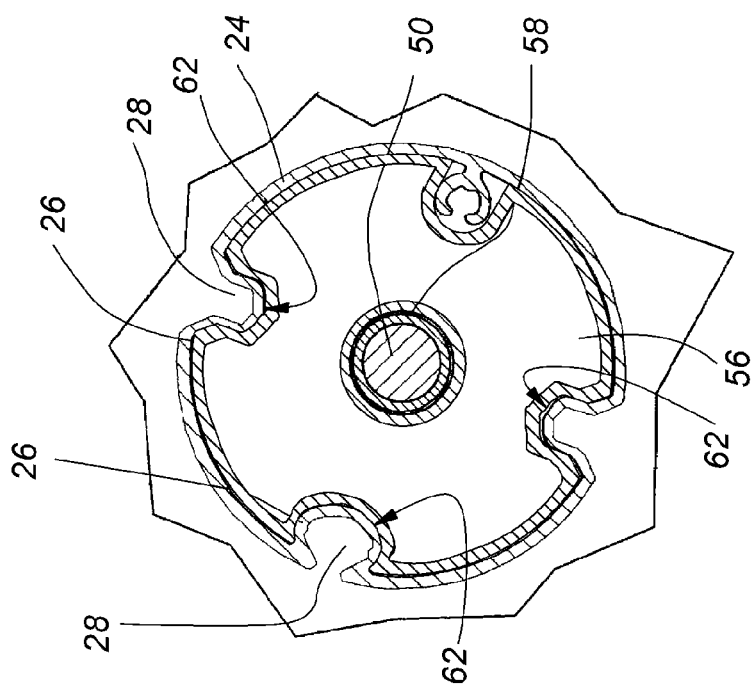
FIG. 8 is a cross-section view taken along line 8-8 of FIG. 6B.

FIGS. 6A and 6B are vertical cross-sections through the right end and left end of the awning 12 showing in FIG. 6A the relationship of the roll bar 24, the right end roll bar support 72, and the right end cap 18. FIG. 6B shows the relationship of the roll bar 24, the drive shaft 50 of the motor 48, the left end roll bar support 56, and the one-way bearings 58. FIGS. 7 and 8 are sections through FIGS. 6A and 6B, respectively, again illustrating the relative relationship between the component parts.

Figure 2:
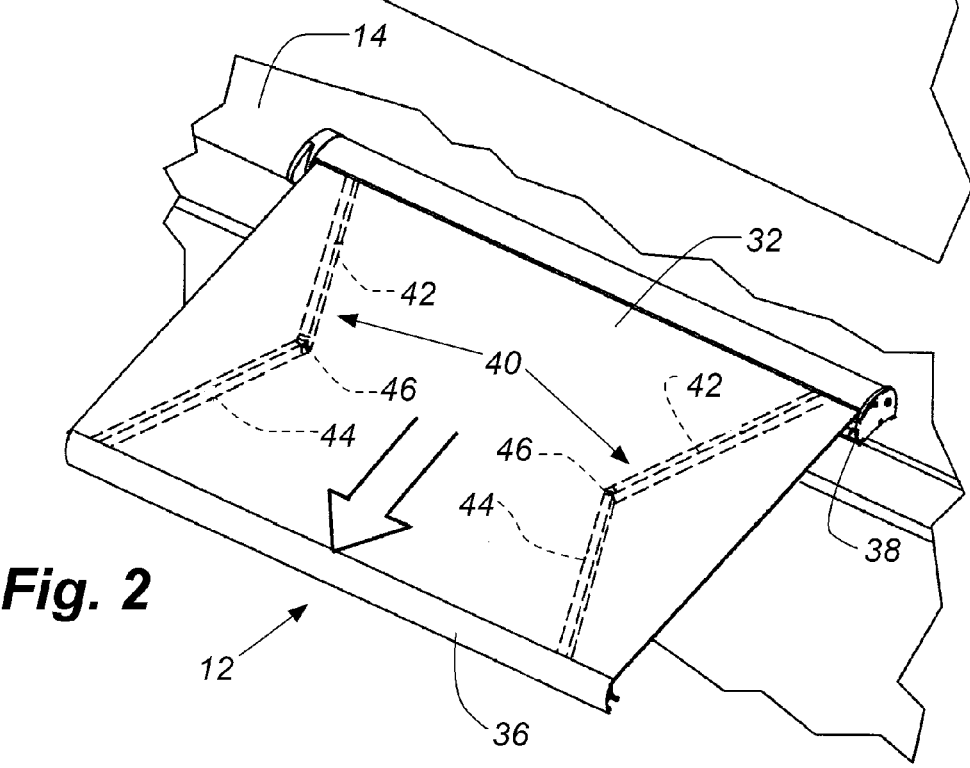
FIG. 2 is a fragmentary isometric view similar to FIG. 1 with the awning in an extended position.
Figure 4:
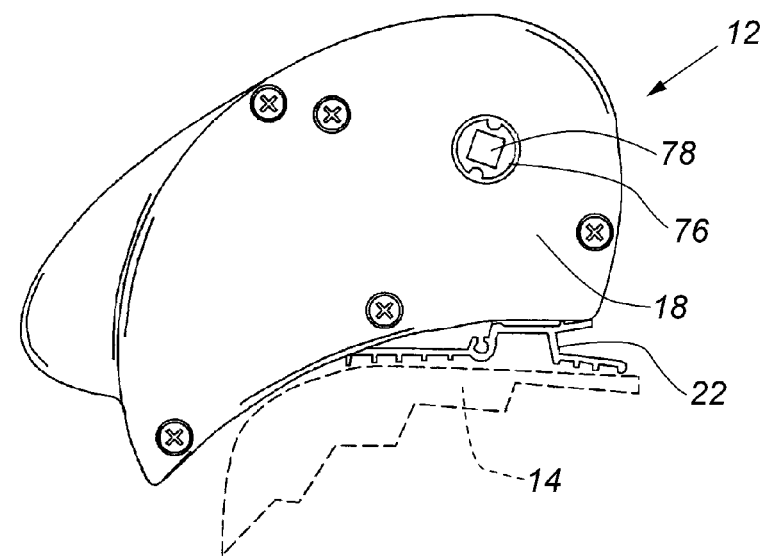
FIG. 4 is an enlarged right end elevation view of the awning as shown in FIG. 3 without the ratchet handle.

In operation, the one-way bearings 58 resist the bias of the supports arms 40 that constantly push to unfurl the canopy 32. When the motor 48 is driven in a counterclockwise direction as viewed in FIG. 5B, the roll bar 24 is also rotated in a counterclockwise direction due to the one-way bearings 58. Due to the bias on the support arms 40, the lead bar 36 is forced to extend further and further away from the roll bar 24 as the awning canopy 32 is fed off the roll bar 24 allowing the awning 12 to extend. The awning 12 extends until it is fully extended as shown in FIG. 2 at which point the motor 42 stops. Thus, the motor 48 does not drive the canopy 32 to unfurl. Instead, due to the one-way bearings 58, the motor provides a rolling resistance to the outward bias of the support arms 40 and incrementally allows the roll bar 24 to rotate and the canopy 32 to unfurl. When the motor 48 is not operating, the one-way bearings 58 do not allow the roll bar 24 to rotate counterclockwise when viewed from the direction of the right end cap 18 and thus the canopy 32 is held in a stationary position.

It will be appreciated that if the motor 48 is driven in a direction so that the drive shaft 50 as viewed in FIG. 5B is rotated in a clockwise direction, the awning canopy 32 will yieldingly resist such rotation due to the bias of the support arms 40. When the motor 48 turns the drive shaft 50 in this direction to roll up the canopy 32, the one-way bearings 58 prevent rotation of the left end roll bar support 56 in a counterclockwise direction relative to the drive shaft 50. In other words, as the drive shaft 50 is rotated in a clockwise direction, the roll bar 24 is also rotated in a clockwise direction. The right end of the roll bar 24 is free to rotate in either direction so it does not resist rotation of the roll bar 24 by the motor 48. Rotation of the roll bar 24 in a clockwise direction causes the awning canopy 32 to be wrapped therearound inasmuch as the awning canopy 32 as best seen in FIG. 5A is wrapped across the top surface of the roll bar 24.

As will be appreciated from the above, however, should the motor 48 malfunction when the awning 12 is extended, the awning 12 can still be retracted through the use of the manual overdrive system at the right end of the awning 12. In other words, a manual drive tool such as the ratchet wrench 80 shown in FIG. 3 having a square drive shaft is inserted through the right end cap 18 into the cylindrical projection 76 on the right end roll bar support 72 and the support 72 is rotated in a clockwise direction as viewed in FIG. 3 or 5A, which causes the awning canopy 32 to be wrapped around the roll bar 24 and the awning 12 itself to be retracted. This movement is permitted due to the fact that the one-way bearings 58 at the opposite end of the awning 12 permit free rotation of the left end roll bar support 56 relative to the motor drive shaft 50. Of course, if the motor 48 is inoperative, the motor drive shaft 50 is stationary and the left end roll bar support 72 is merely rotated about the drive shaft 50 through rotation of the right end of the roll bar 24 with the ratchet wrench 80 as the one-way bearings 58 do not resist the movement of the roll bar 24 about the drive shaft 50 in this direction. Thus, since the roll bar 24 is free to rotate in a clockwise direction about the motor drive shaft 50 due to the one-way bearings 58 that passively disengage the roll bar 24 from the drive shaft 50, a ratchet wrench 80 at the right end of the awning 12 can be used to rotate the roll bar 24 in a clockwise direction, but could not rotate the roll bar 24 in a counterclockwise direction unless the motor shaft 50 itself were also rotating in that same direction.

Referring to FIGS. 9 and 10, an alternative system is illustrated where like parts have been given like reference numerals with a prime suffix. it will there be seen in FIG. 9 that the left end of the awning 12' at the left end cap 20' again has a reversible motor 48' mounted thereon with the motor having a drive shaft 50' that extends down the longitudinal axis of the roll bar 24'. The drive shaft 50' has longitudinally-extending, circumferentially-spaced teeth 82 formed at an intermediate location along the length of the drive shaft 50' with the teeth being tapered in a clockwise direction as seen best in FIG. 10. A pair of two-way bearings 84 is mounted on the drive shaft on opposite sides of the teeth and is press-fit on the drive shaft as well as into an axial cylindrical passage 70' through the left end roll bar support 56'. The two-way bearings 84 are conventional bearings, which would permit rotation of the left end roll bar support 76' in either direction relative to the drive shaft 50' of the motor 48'.

The teeth 82 on the drive shaft 50' in this embodiment are operatively engaged with a spring-biased pawl 86 which is pivotally mounted in a square-shaped passage 88 through the left end roll bar support 56' so that the pawl 86 is pivotally mounted on an axially-extending pivot pin 90 within the square passage 88, and a spring 92 is seated in the pawl 86 and engaged with a sidewall of the square passage 88 to pivotally bias the pawl 86 in a counterclockwise direction as viewed in FIG. 10. The free or distal end of the pawl 86 defines a sharp edge 94 adapted to engage the teeth 82 on the drive shaft 50' and due to the angular relationship of the teeth 82 relative to the tip of the pawl 86, the roll bar 24' is prevented from being rotated in a counterclockwise direction relative to the drive shaft 50', but the roll bar 24' can be rotated in a clockwise direction relative to the drive shaft 50' as the pawl 86 simply skips or slides over the teeth 82 on the drive shaft 50' due to the resilient mounting of the pawl 86. In other words, the pawl 86 is provided to prevent counterclockwise rotation of the roll bar 24' relative to the drive shaft 50' but permits clockwise rotation of the roll bar 24' relative to the drive shaft 50'.

Pursuant to this mounting, if the drive shaft 50' of the motor 48' is driven in a clockwise direction, as viewed in FIG. 9 or 10, it forces the left end roll bar support 56' to also rotate in a clockwise direction thereby rotating the roll bar 24' in a clockwise direction to wrap the awning canopy 32' around the roll bar 24' and retract the awning 12'. If the motor 48' is driven in the opposite or counterclockwise direction, the awning 12' will still deploy or extend due to the fact that the spring bias on the support arms 40' is urging the lead bar 36' away from the roll bar 24' placing tension in the awning canopy 32', which urges the roll bar 24' to rotate with the drive shaft 50'.

The right end of the awning 12' in this embodiment is mounted identically to that of the first-described embodiment as shown in FIG. 5A so that the roll bar 24' for the awning 12' can be rotated in a clockwise direction as viewed in FIG. 5A with, for example, a ratchet wrench 80. The pawl 86, as mentioned previously, permits rotation of the roll bar 24' in a clockwise direction relative to the drive shaft 50' so that if the motor 48' were inoperative for whatever reason, and its drive shaft 50' were therefore stationary, the pawl 86 passively disengages from the teeth 82 on the drive shaft 50' and clockwise rotation of the roll bar 24' would be permitted with the ratchet wrench 80' so that the awning 12' could be retracted.

Figure 11:
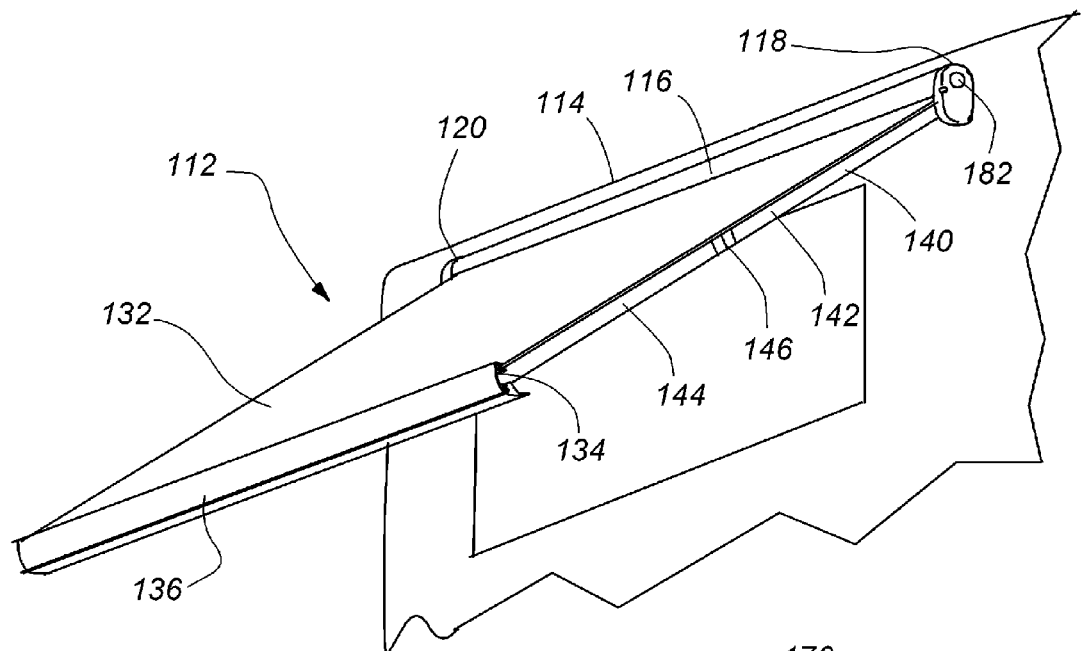
FIG. 11 a fragmentary isometric view of an alternate implementation of an awning with a manual override system.
Figure 12:
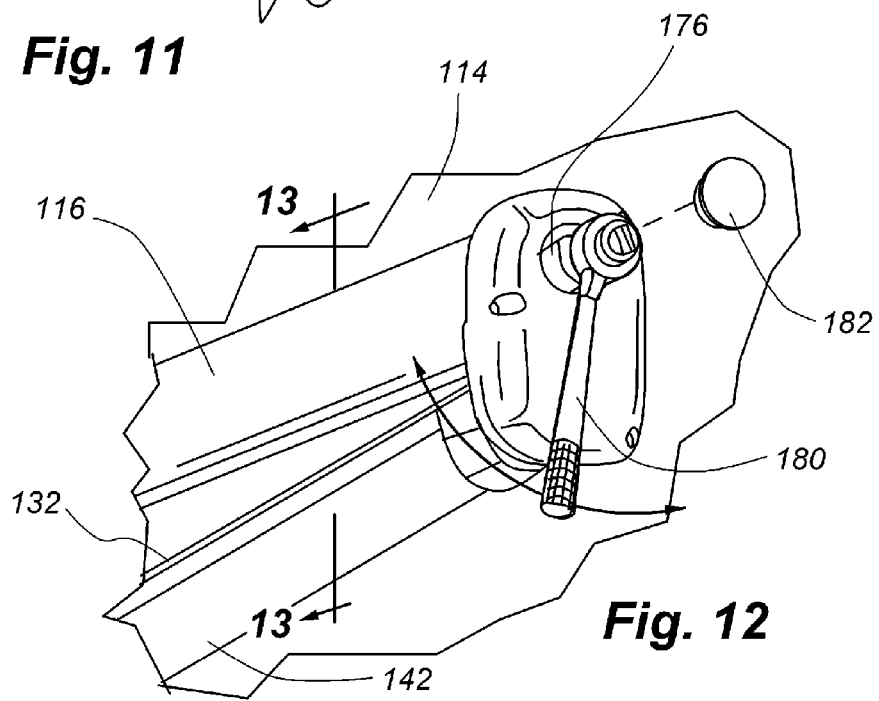
FIG. 12 is a fragmentary isometric view of the right end of the awning of FIG. 11 and illustrating a ratchet wrench for manually retracting the awning.

An alternative embodiment for a manual override system for a motorized awning is depicted in FIGS. 11-21. Many of the features of this embodiment are similar to the two embodiments previously described, but may be noted in the description of this embodiment again for the sake of clarity. As depicted in FIGS. 11 and 12, a motorized awning 112 is composed of a canopy 132 that is stored within and extends from a housing 116. The housing 116 has a right end cap 118 and a left end cap 120, and is mounted to a mounting surface 114, which may be the sidewall or roof of a recreational vehicle. An outer edge 134 of the canopy 132 is retained within a rigid lead bar 136. A pair of support arms 140 is connected at first ends to the housing 116 adjacent the right end cap 118 and the left end cap 120, respectively, and at opposite second ends adjacent to the lateral ends of the lead bar 136. The support arms 140 are composed of an inner arm 142 and an outer arm 144 joined together by an elbow joint 146. The inner arm 142 is pivotally attached at the housing 116 while the outer arm 144 is pivotally attached to the lead bar 136. The support arms 140 are configured to bend inward at the elbow joint 146 to fold for storage within the housing 116 when the awning 112 is in the retracted state. The support arms 140 are configured to be under a constant bias (e.g., due to spring, pneumatic or hydraulic force) toward an outward or extended position to aid in unfurling the canopy 132 from the housing 116 and provide a self-supporting structure for the canopy 132 once unfurled.

An access cap 182 is depicted on the surface of the right end cap 118. Upon removal of the access cap 182 a cylindrical projection 176 with a drive recess (not shown; see e.g., FIGS. 4 and 6A) is exposed for manual override access by a ratchet wrench 180 or other manual drive tool or implement configured for engagement with the recess and the cylindrical projection 176. The cylindrical projection 176 extends from a manual drive roll bar support (not shown) of the same or similar type as previously described with respect to FIG. 5A. The manual drive roll bar support interfaces with the roll bar 124 as previously shown and described with respect to FIG. 5A, however, the manual override system for circumventing the motor drive shaft to allow for manual retraction of the awning 112 is different than the previous embodiments and is described in further detail below.

Figure 13:
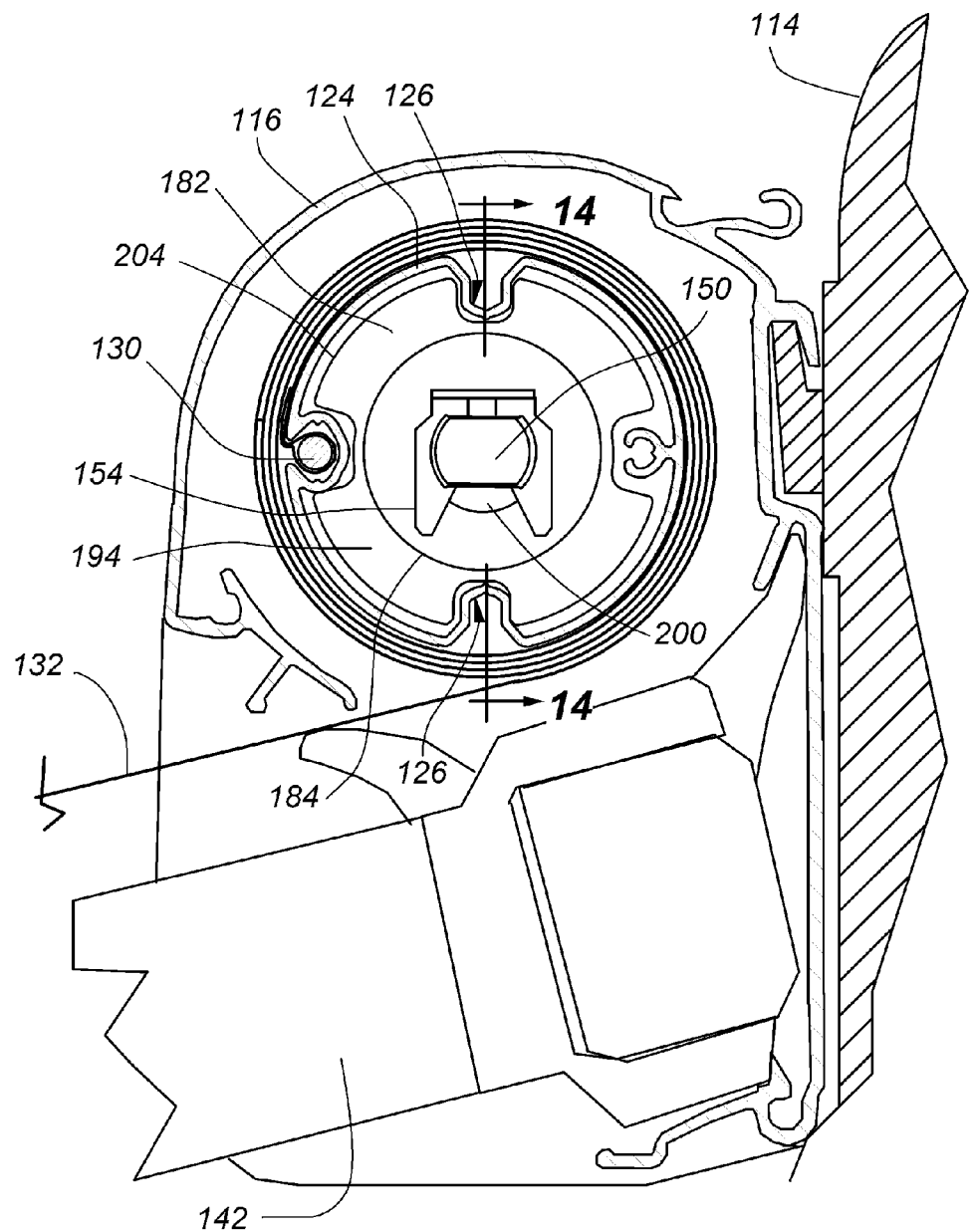
FIG. 13 is a cross-section view taken along the line 13-13 of FIG. 12 depicting a gravity ratchet installed in a roll bar of the awning of FIG. 11.
Figure 14:
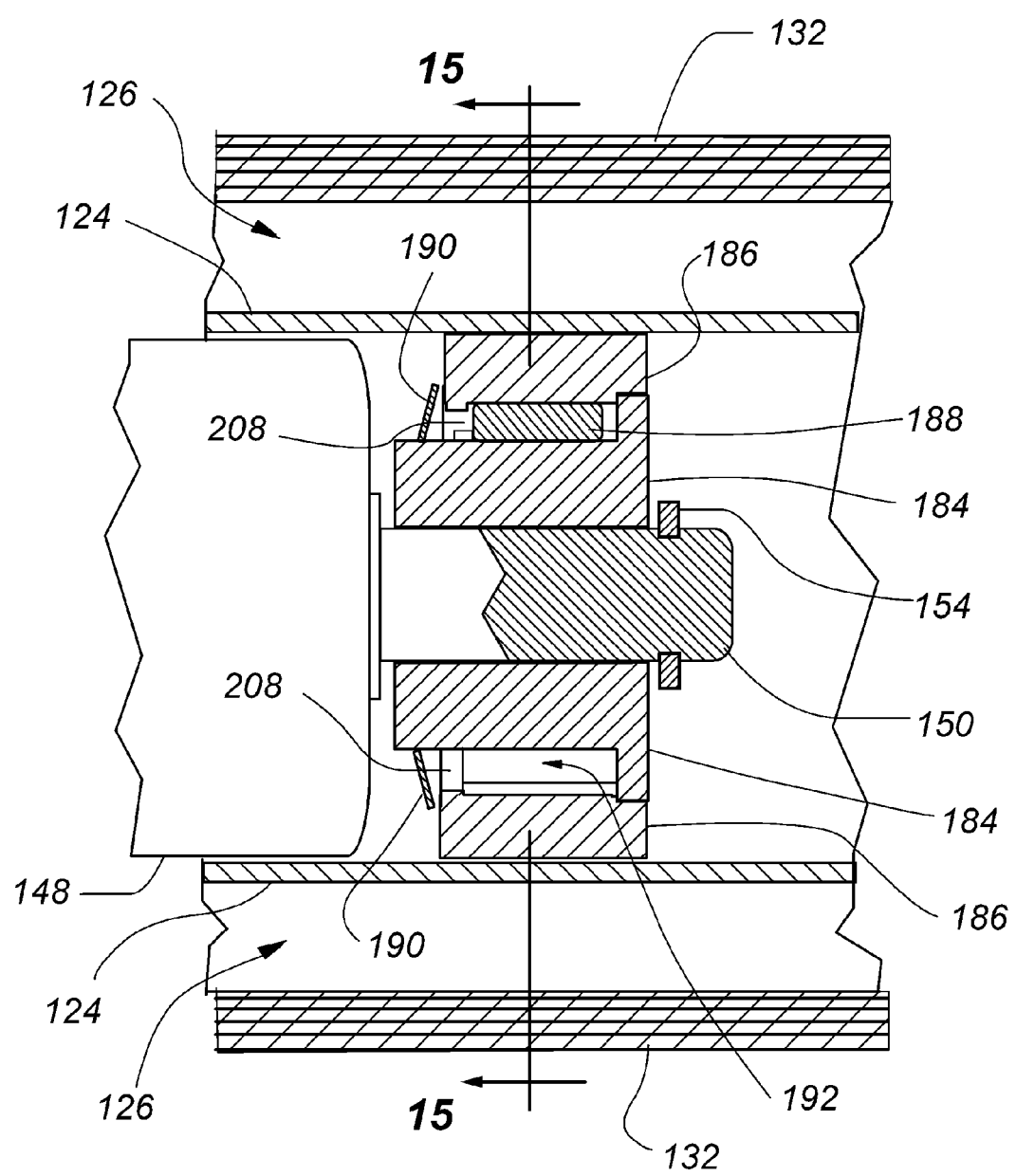
FIG. 14 is a cross-section view taken along the line 14-14 of FIG. 13 depicting the gravity ratchet installed in the drive shaft of a tubular motor.
Figure 21:
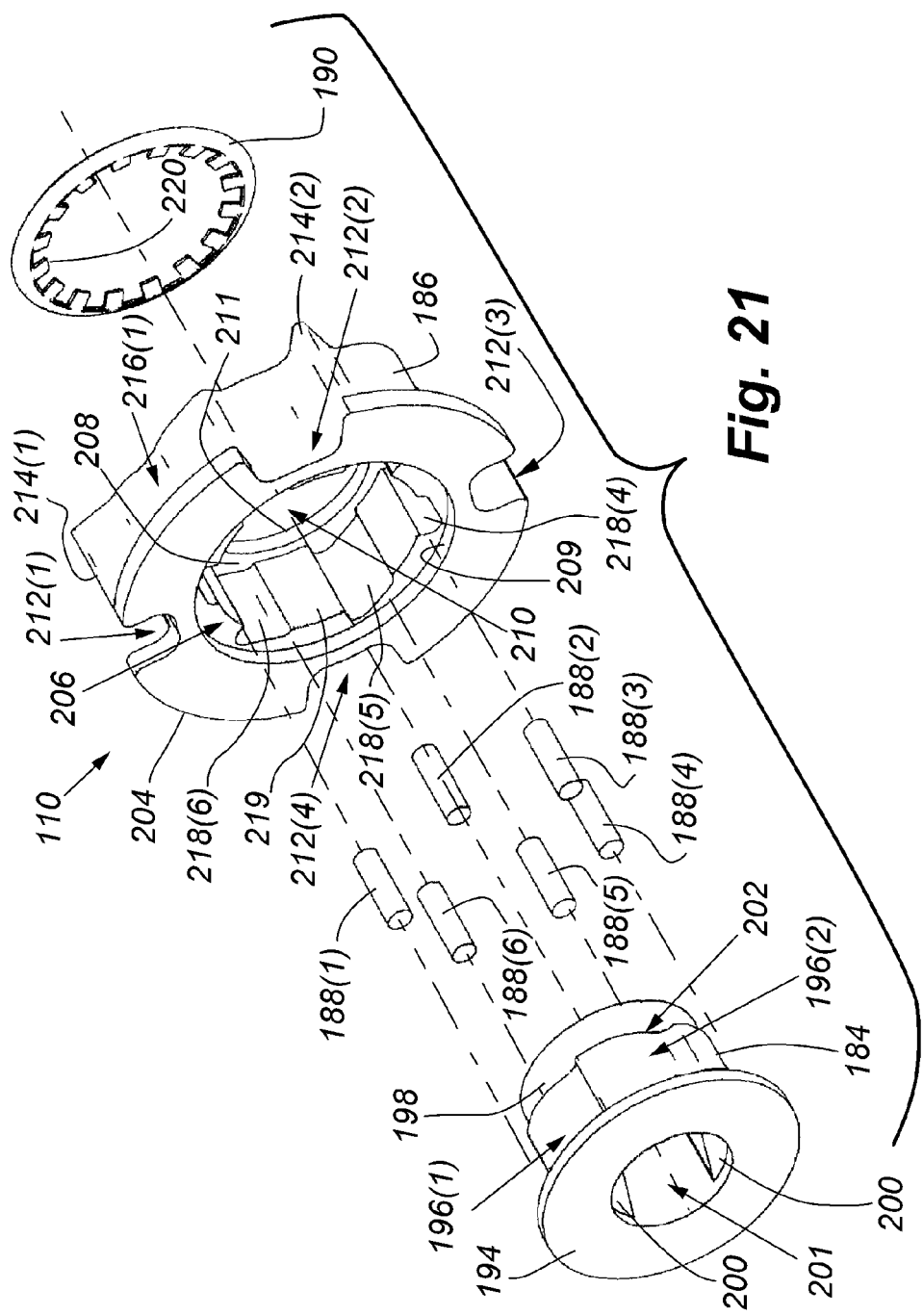
FIG. 21 is an exploded right-rear isometric view of the components of the gravity ratchet of FIG. 19.

In this implementation, a gravity ratchet device 110 functions as the manual override mechanism to effect a manual override for the awning 112 over a drive motor 148 The gravity ratchet device 110 is depicted to best advantage in FIGS. 19-21, while its installation in the housing 116 is depicted in FIGS. 13 and 14, and its operation is depicted in FIGS. 15-18. The gravity ratchet 110 is constructed of three primary components: a ratchet hub 184, a ratchet cap 186, and a plurality of cylindrical rollers 188(1)-188(6). In the depicted implementation, the gravity ratchet 110 is designed to hold six rollers 188(1)-188(6), but the gravity ratchet 110 could be designed to operate with greater or fewer rollers depending upon the particular application. The ratchet hub 184 is received within the ratchet cap 186 thereby defining a plurality of bearing pockets 192 in which the rollers 188(1)-188(3) reside.

The ratchet hub 184 appears similar to a plug with a circular flange portion 194 connected with a tube portion 195 extending from a sidewall thereof. The tube portion 195 has varied surfaces and a varied cross section along its length; however, a diameter measurement at any point is less than the diameter of the flange portion 194 such that the flange portion 194 extends beyond the sidewalls of the tube portion 195. The tube portion 195 is divided into two sections: a contoured wall section 197 adjacent the flange portion 194 and a cylindrical retention surface 198 extending from the contoured wall section 197 opposite the flange portion 194. The end of the tube portion 195 adjacent the retention surface 198 is formed as a flat annular face 199 which may have a chamfered perimeter edge transitioning to the retention surface 198.

The contoured wall section 197 is composed of a series of surfaces that form the inner pocket walls 196(1)-196(6) of the bearing pockets 192. The ratchet hub 184 is formed with a number of inner pocket walls 196 corresponding to the number of rollers 188 used in the particular design of the gravity ratchet 110. The width of the contoured wall section 197 is at least as long as the length of the rollers 188. Each of the inner pocket walls 196(1)-196(6) is formed as a sloped ramp starting at a high point at a first edge and sloping gradually downward in a counter-clockwise direction (in the context of FIG. 20) to a low point at the same diameter as the retention surface 198. Each of the inner pocket walls 196(1)-196(6) then sharply curves upward to a larger radius dimension than the adjacent retention surface 198 to create an edge with the beginning of a clockwise sloping surface forming the adjacent inner pocket wall 196 of the contoured wall section 197.

The ratchet hub 184 also defines a keyed passageway 201 extending axially therethrough. The passageway 201 is defined in part by parallel key walls 200 that interface with a drive shaft 150 of the awning motor 148 as further described herein below. In a similar manner to the inner pocket walls 196(1)-196(6), the outer pocket walls 218(1)-218(6) are formed as curved recesses between intermediate sections 219 that follow the curve of a circle that is slightly larger in diameter than a largest diameter measurement across the contoured wall section 197 of the ratchet hub 184. When viewed from the orientation shown in FIGS. 15-18 and 21, the curved recesses forming the outer pocket walls 218(1)-218(6) are deeper at a clockwise edge and taper such that the recess is shallower at a counterclockwise edge, respectively. At the clockwise edge, the curve of the recess of the outer pocket walls 218(1)-218(6) generally matches the curve of the circumference of the cylindrical rollers 188. The depth of the recess at the clockwise edge of the outer pocket walls 218(1)-218(6) is slightly less than the diameter of the cylindrical rollers 188(1)-188(6). At the counterclockwise edge of the recesses forming the outer pocket walls 218(1)-218(6), the curve adjacent the intermediate sections 219 again matches the circumferential curve of the rollers 188(1)-188(6). However, the depth of the recess at the counterclockwise edge is slightly less than half the diameter of each of the cylindrical rollers 188(1)-188(6).

The ratchet cap 186 defines a cap flange 204 that having a generally circular form when viewed from a first side and an amorphous perimeter shape with a plurality of fingers 214(1)-214(4) extending quasi-radially when viewed from a second opposing side. The first side forming the cap flange 204 is generally an annular wall that defines the circular entry aperture 209 that leads into a chamber 210 that is defined within the ratchet cap 186. The back of the chamber 210 is defined by a circular aperture 211 such that there is a passageway completely through the ratchet cap 186. The perimeter of the exit aperture 211 is formed by a lip surface 208. The exit aperture 211 is smaller in diameter than the entry aperture 209, but both the entry aperture 209 and the exit aperture 211 are coaxial with each other. Within the chamber 210 between the annular flange 204 and the lip surface 208, the sidewalls form the outer pocket wall 218 of the bearing pockets 192.

The gravity ratchet 110 is assembled by inserting the ratchet hub 184 within the chamber 210 of the ratchet cap 186 and placing the cylindrical rollers 188(1)-188(6) within respective bearing pockets 192 formed between the inner pocket walls 196(1)-196(6) and the outer pocket walls 218(1)-218(6). The diameter of the entry aperture 209 in the flange 204 of the ratchet cap 186 is slightly larger than the diameter of the flange 194 of the ratchet hub 184 such that when the ratchet hub 184 is inserted into the chamber 210 in the ratchet cap 186, a closely registered interface between the outer diameter of the hub flange 194 and the diameter of the entry aperture 209 is achieved. Similarly, the diameter of the ratchet hub 184 at the section forming the retention surface 198 is slightly smaller than the diameter of the exit aperture 211 of the ratchet cap 186 such that when the ratchet hub 184 is inserted into the chamber 210 of the ratchet cap 186, a close registration is achieved between the retention surface 198 and the edge of the lip surface 208 defining the exit aperture 211.

In addition the back surface of the hub flange 194 interfaces with interface surfaces 206 in the ratchet cap 186 that are primarily edges of the intermediate sections 219 that extend in a radially inward direction to define a smaller diameter across than the diameter of the entry aperture 209. Similarly an interface surface 202 on the ratchet hub 184 formed by end edges of the inner pocket walls 196(1)-196(6) engages with the lip surface 208 within the chamber 210 of the ratchet cap 186.

The retention surface 198 of the ratchet hub 184 extends outwardly axially from the exit aperture 211 of the ratchet cap 186. The ratchet hub 184 is retained within the chamber 210 of the ratchet cap 186 by a retention washer 190 that is placed around the retention surface 198 outside the chamber 210 and adjacent the exit aperture 211. A plurality of teeth 220 extend radially inward from an outer annular ring of the retention washer 190 and are biased to resist removal of the retention washer 190 from the retention surface 198.

In the present implementation as shown in FIG. 14, a tubular motor 148 is used to drive the roll bar 124. The tubular motor 148 fits concentrically within the axial passage formed by the roll bar 124. The back end of the tubular motor 148 is fixedly attached to mounting structures at the left end cap 120 (not shown). A drive shaft 150 extends from the opposite end of the tubular motor 148 and is of sufficient length to extend through the keyed passageway 201 in the ratchet hub 184 of the gravity ratchet 110.

The gravity ratchet 110 is thus inserted on the drive shaft 150 with the key walls 200 of the keyed passageway 201 interfacing with corresponding flat walls of the drive shaft 150. The flange 204 of the ratchet cap 186 is positioned adjacent the distal or free end of the drive shaft 150. A C-clip 154 or other fastening device may be attached to a groove, slot, or other interface on the free end of the drive shaft 150 to lock the gravity ratchet 110 onto the drive shaft 150.

The flange 204 of the ratchet cap 186 is interrupted along its circumferential edge by four cutouts 212(1)-212(4) that are sized and configured to receive the inwardly-directed, longitudinal protrusions 126 along the length of the roll bar 124. The tubular motor 148 with the attached gravity ratchet 110 is inserted within the roll bar 124 from the side of the left end cap 120 and the cut outs 212(1)-212(4) of the flange 204 are oriented to interface with the corresponding longitudinal protrusions 126 formed within the wall of the roll bar 124. The fingers 214(1)-214(4) of the ratchet cap 186 follow a portion of the form of the cutouts 212(1)-212(4) and are thus positioned adjacent clockwise side edges of the longitudinal protrusions 126 of the roll bar 124. Portions of the engagement surfaces 216(1)-216(4) adjacent respective fingers 214(1)-214(4) and extending in a counterclockwise direction slightly cup the bottoms of the longitudinal protrusions 126. In this manner the fixed back end of the tubular motor 148 allows the motor to apply torque through the drive shaft 150 to the ratchet hub 184 of the gravity ratchet 110 and, depending upon the mode, engages the roll bar 124 through the interfaces with the fingers 214(1)-214(4) to selectively unfurl and furl the canopy 132 within the awning 112.

The actual operation of the various modes of the gravity ratchet 110 is depicted in FIGS. 15 through 18. In the first mode shown in FIG. 15, the canopy 132 is being unfurled from a furled state on the roll bar 124. Three of the cylindrical rollers 188(1), 188(5), 188(6) are engaged between respective inner pocket walls 196(1), 196(5), 196(6) and outer pocket walls 218(1), 218(5), 218(6) while the other three rollers 188(2), 188(3), 188(4) rest loosely within their respective bearing pockets 192 at the clockwise, deep ends of the outer pocket walls 218(2), 218(3), 218(4) and thus do not interface with contoured wall section 197 of the ratchet hub 184. As should be apparent upon review of the positions of the engaged rollers 188(1), 188(5), 188(6), the motor 148 and the drive shaft 150 do not actually drive the unfurling of the canopy 132, but instead maintain a rolling resistance to the constant force of the support arms 140 that are biased to push the awning 112 to an open position.

The binding force resistance of the rollers 188(1), 188(5), 188(6) is transferred to the fingers 214(1)-214(4) and the cutouts 212(1)-212(4) in the flange 204 of the ratchet cap 186 that interface with the longitudinal protrusions 126 and prevent the roll bar 124 from further movement in the clockwise direction to unfurl the canopy 132. When the motor 148 is driven such that the drive shaft 150 rotates in a clockwise direction, the ratchet hub 184 similarly rotates in a clockwise direction within the chamber 210. As the bearing pockets 192 rotate clockwise, the cylindrical rollers 188 will roll out of the interface positions indicated by rollers 188(1), 188(5), 188(6) into positions within the deeper clockwise-side recesses at the positions of outer pocket walls 218(2), 218(3), 218(4). However, as the drive shaft 150 rotates the ratchet hub 184, the outer pocket walls 218(2), 218(3), 218(4) will eventually rotate into the positions occupied by 218(1), 218(5), 218(6). In other words, the rollers 188(2), 188(3), 188(4) will, due to gravity, roll toward the counterclockwise side of the recesses of the outer pocket wall 218(2), 218(3), 218(4) and thus be in positions to engage opposing inner pocket walls 196(2), 196 (3), 196(4), thereby allowing the drive shaft 150 and the gravity ratchet 110 to constantly resist the constant force of the support arms 140 on the canopy 132 as the drive shaft 150 turns. It may be noted that if the motor 148 were to be turned off and the clockwise motion of the drive shaft 150 were arrested, the awning 112 would no longer unfurl due to the interface of half of the rollers 188 between the ratchet hub 184 and the ratchet cap 186.

Additionally, it should be recognized that once the canopy 132 is fully unfurled the support arms 140 will be at their full extension and will no longer place force against the motor 148. Under these conditions, if the motor 148 were not under feedback control to stop when the tension of the support arms 140 subsides but were to continue to turn the drive shaft 150, the ratchet hub 184 would merely slip within the chamber 210. If the gravity ratchet 110 did not slip, the motor 148 would potentially operate the roll bar 124 in a backward fashion and undesirably roll up the canopy 132 in a clockwise direction. This ability for the ratchet hub 184 to slip within the chamber 210 of the ratchet cap 186 will be explained in greater detail below with respect to the manual override conditions shown in FIGS. 17 and 18.

Figure 15:
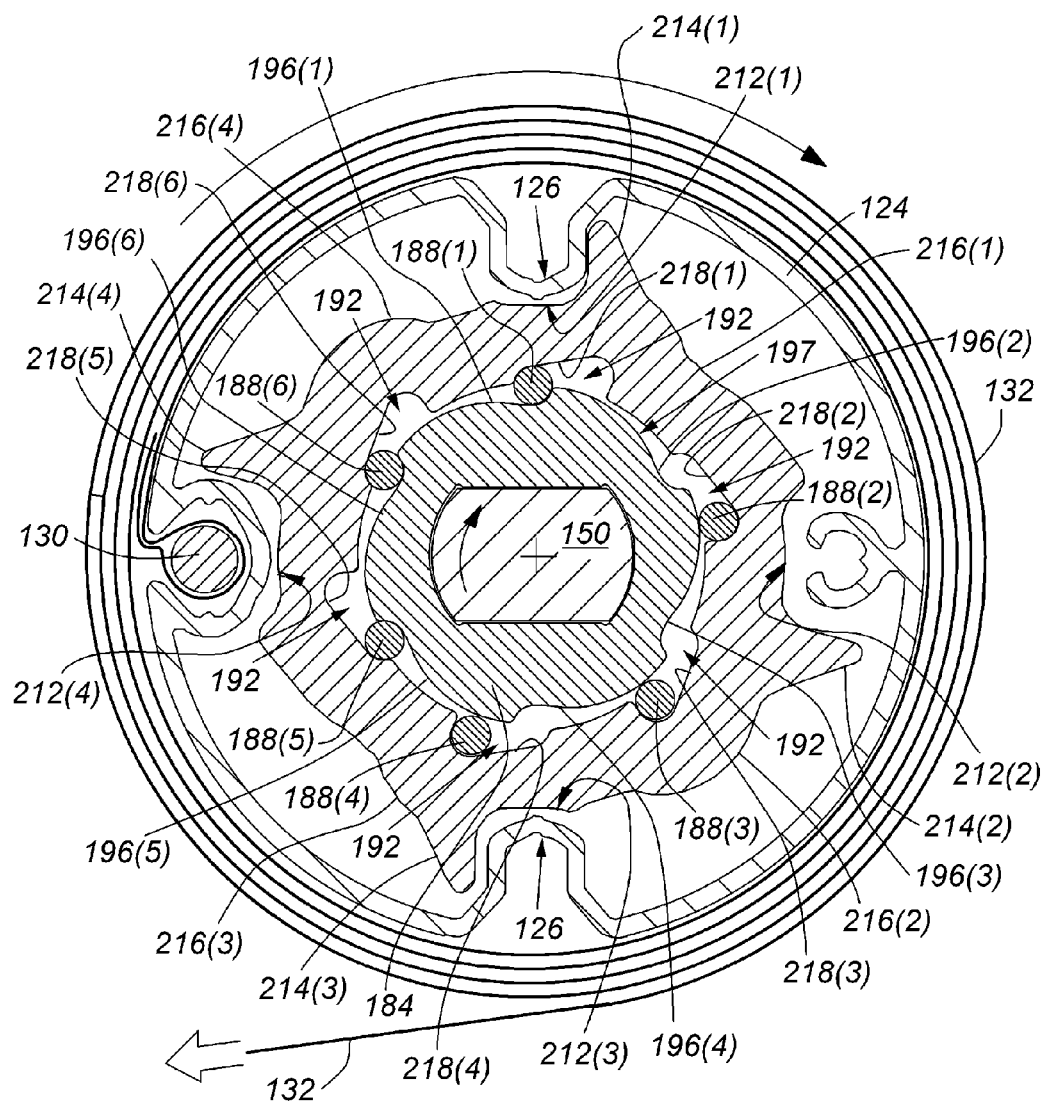
FIG. 15 is a cross-section view taken along the line 15-15 of FIG. 14 depicting a first mode of the gravity ratchet while the roll bar is rotated in a clockwise direction to unfurl the canopy.
Figure 16:
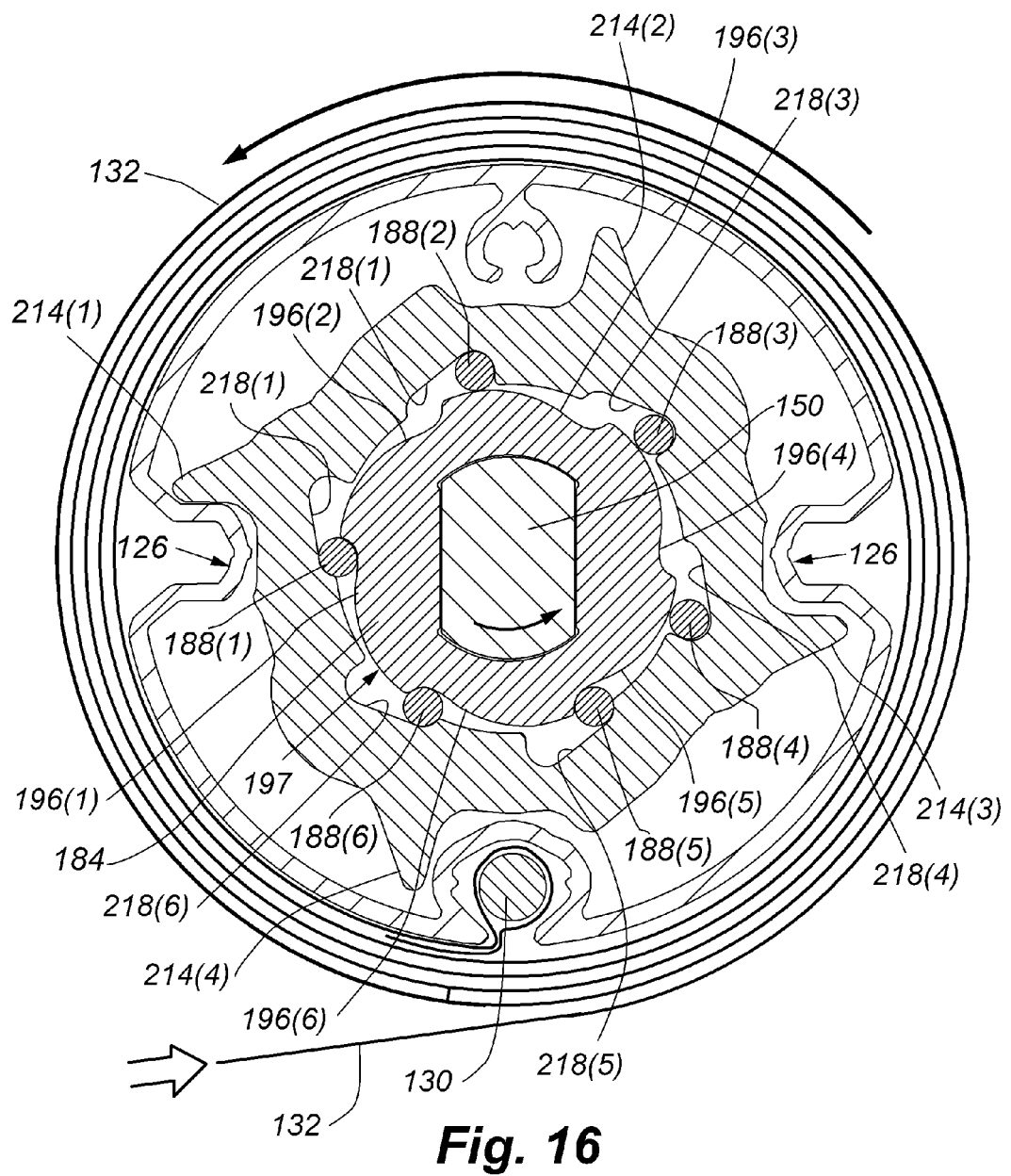
FIG. 16 is a cross-section view comparable to FIG. 15 depicting a second mode of the gravity ratchet while the roll bar is rotated in a counter clockwise direction to furl the canopy.

FIG. 16 presents a second mode of operation in which the canopy 132 is furled around the roll bar 124 during retraction of the awning 112. In this mode the motor 148 reverses direction and the drive shaft 150 rotates in a counterclockwise direction as seen from the perspective of FIG. 16 viewing the cross section from the right end cap 118. In this mode the motor 148 is actually driving against the constant outward force of the support arms 140 rather than merely resisting such force as in the unfurling mode of FIG. 15. As seen in FIG. 16 three of the rollers 188(1), 188(5), 188(6) are engaged between respective inner pocket walls 196(1), 196 (5), 196(6) and outer pocket walls 218(1), 218(5), 218(6). The rollers 188(1)-188(6) are positioned in the shallow or counterclockwise side of the recesses. As is apparent in FIG. 16 the interface of the rollers 188(1), 188(5), 188(6) within the respective bearing pockets 192 translates the force from the drive shaft 150 to the fingers 214(1)-214(4) to push against respective longitudinal protrusions 126 to direct the roll bar 124 in a counterclockwise direction, thus resisting the outward force of the support arms and furling the canopy 132 around the roll bar 124.

Note that the remaining rollers 188(2), 188(3), 188(4) are within the deeper recesses of the outer pocket walls 218(2), 218(3), 218(4) and do not engage any of the contoured wall sections 197 of the ratchet hub 184. Note also that if the motor 148 were to stop, the interface between the drive shaft 150 keyed with the ratchet hub 184 and extending through the engaged rollers 188 to fingers 214(1)-214(4), then the static force of the drive shaft 150 will resist the constant force of the support arms 140 on the canopy 132 and prevent the roll bar 124 from rotating in a clockwise direction and thereby unfurling the canopy 132. Note further that when the canopy 132 is completely furled the lead bar 136 will engage the housing 116 and provide an "infinite" force on the drive shaft 150, which resistance may be understood as an indication to the motor 150 to turn off because the canopy 132 is completely furled.

Figure 17:
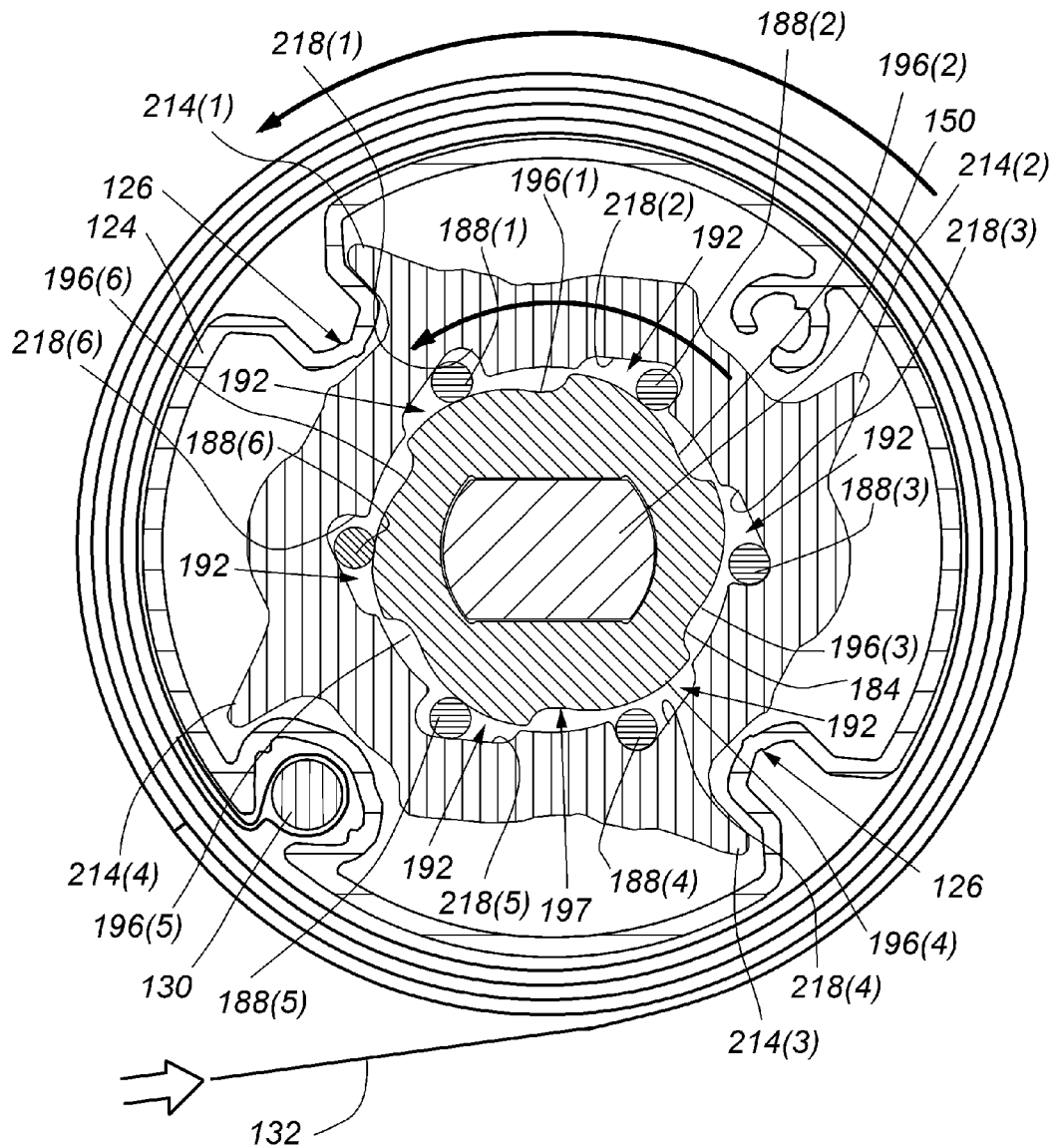
FIG. 17 is a cross-section view comparable to FIG. 15 depicting a third mode of the gravity ratchet in a first position of a manual override configuration while the roll bar is rotated in counter clockwise direction to furl the canopy.
Figure 18:
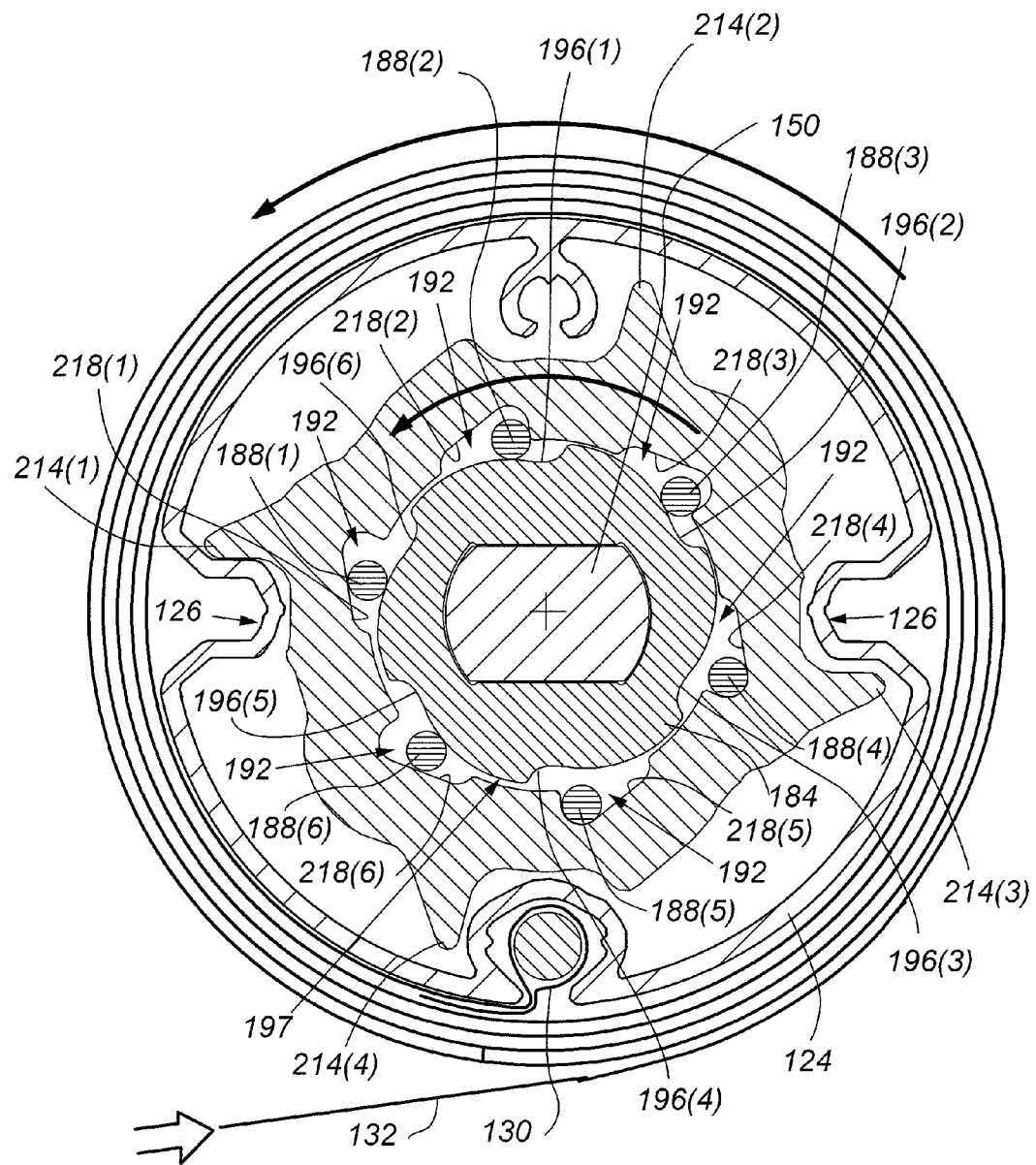
FIG. 18 is a cross-section view comparable to FIG. 17 depicting the third mode of the gravity ratchet in a second position of the manual override configuration while the roll bar is rotated in counter clockwise direction to furl the canopy.

FIGS. 17 and 18 depict the operation of the gravity ratchet 110 in a manual override mode for retracting the awning 112. In the event of a malfunction of the motor 148 in which the drive shaft 150 is locked and will not rotate, a user may nevertheless need to retract the awning 112 and furl the canopy 132, for example, in the event of a significant windstorm or merely because the user needs to drive the recreational vehicle to which the awning 112 is attached. In such an event the user may remove the access cap (see FIGS. 11 and 12) and insert a ratchet wrench 180 or other implement into the cylindrical projection 176 accessible under the access cap 182. The cylindrical projection 176 as previously described has a recess for engagement by the ratchet wrench 180 and is further physically connected to the roll bar 124, thus allowing the user to manually rotate the roll bar 124 within the housing 116.

Recall that the ratchet cap 186 is similarly connected to the roll bar 124 by the interface between longitudinal projections 126 and the cutouts 212(1)-212(4) and the corresponding fingers 214(1)-214(4). Thus, as the user rotates the roll bar 124 using ratchet wrench 180 or other tool in a counterclockwise direction from the perspective of the right end cap 118, the ratchet cap 186 will also rotate counterclockwise in unison with the roll bar 124. The drive shaft 150 remains locked and stationary and, because the ratchet hub 184 is keyed to the drive shaft 150, the ratchet hub 184 will similarly remain stationary. Note however, that due to the orientation of the inner pocket walls 196(1)-196(6), the rollers 188(1)-188(6) move to the deep portion of the recesses on the clockwise-sides of each of the outer pocket walls 218(1)-218(6). The rollers 188(1)-188(6) do not create an interference between the inner pocket walls 196(1)-196(6) and the outer pocket walls 218(1)-218(6) but merely rotate along the outer surface of the contoured wall section 197 of the ratchet hub 184 while the ratchet cap 186 moves around the ratchet hub 184. Thus, the ratchet cap 186 passively disengages from the ratchet hub 184 and the roll bar 124 is able to slip with respect to the stationary drive shaft and allow for a manual override to furl the canopy 132 and close the awning 112. This slippage can be easily seen by a comparison between FIG. 17 and FIG. 18 showing the relative positions of the rollers 188 within corresponding bearing pockets 192 after the roll bar 124 has been advanced one-sixth of a turn in the counterclockwise direction.

While the gravity ratchet 110 has been shown in an implementation incorporating a tubular motor 148, it should be understood that the gravity ratchet 110 can be used with equal effect in embodiments employing standard side-mounted, worm drive motors as shown in the embodiments of FIGS. 1-10. Likewise, the one-way override mechanisms shown with respect to the side-mounted, worm drive motors so FIGS. 1-10 can easily be substituted for use with tubular motors mounted within the roll bar with the same effect.

Further, in an implementation using a tubular motor as shown in FIG. 14, many tubular motors incorporate a bearing ring that also functions as part of an electromechanical counter system. The bearing ring is independent of the drive shaft of the tubular motor, but is interconnected with the roll bar. As the roll bar moves in respective clockwise and counterclockwise directions, the bearing ring indicates the number of rotations of the roll bar made in a particular direction to either a mechanical or electronic counter. In some embodiments the bearing ring drives related screws that flip electrical switches once they reach a particular length indicative of the awning being fully outstretched or fully retracted. When tripped upon reaching a predetermined count value for a particular rotational direction, the electrical switches cause the tubular motor to thereby automatically stop when the awning is either fully extended or retracted without need for further manual control. It should be understood that because the gravity ratchet similarly interfaces with the roll bar as it slips around the drive shaft of the motor, the bearing ring on the tubular motor will turn as the awning retracts, thus placing the counter indicator at the fully retracted value. Thus, when the motor is fixed or the electricity restored, there is no need to reset the counter to provide automatic motor stops for the retracted or extended positions. In other words, the manual override system does not adversely affect the automatic stop system.

Figure 22:
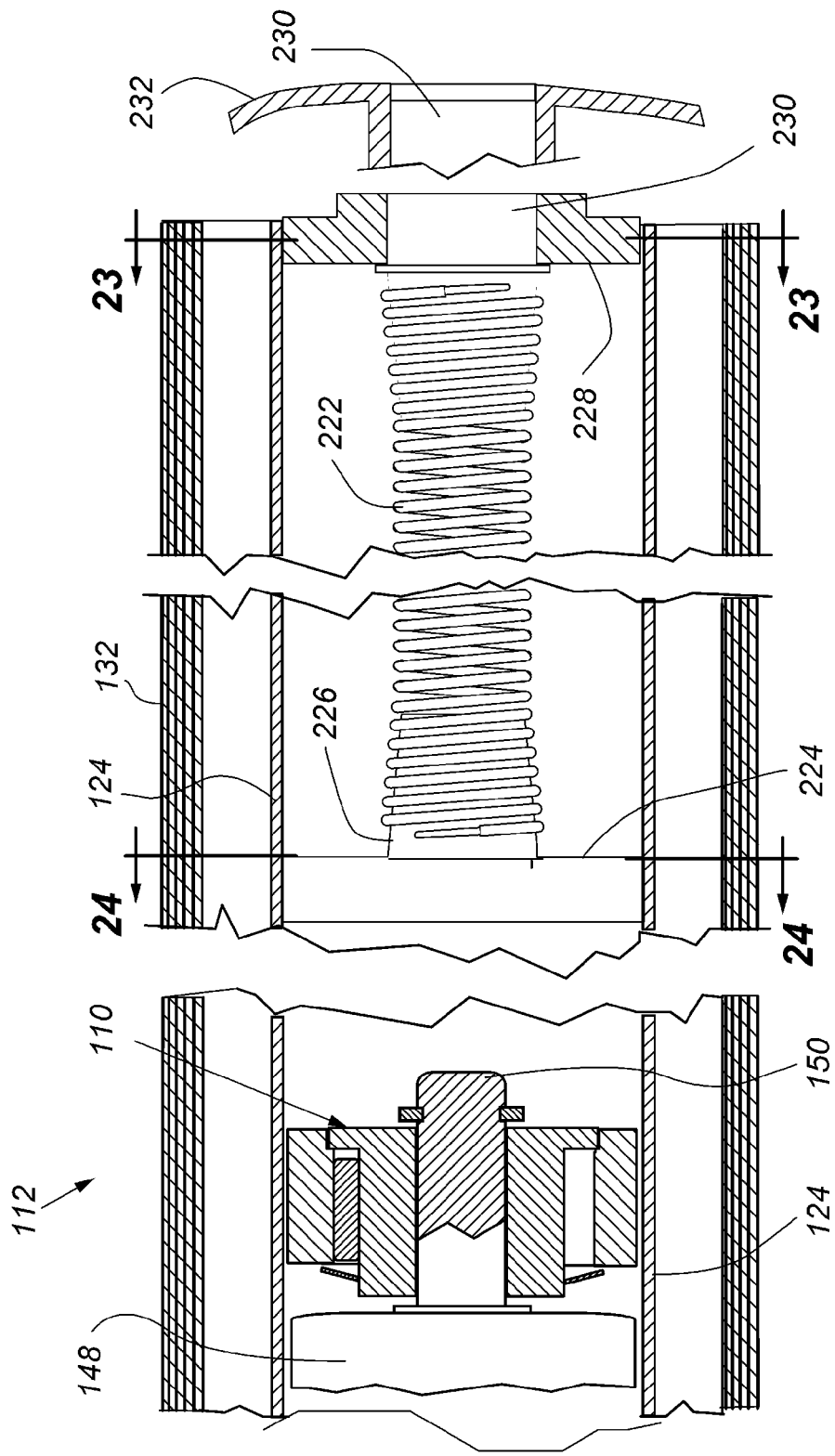
FIG. 22 is a fragmentary cross-section view of a further implementation of a motorized awning system with a manual override including a gravity ratchet and a torsion spring.
Figure 24:
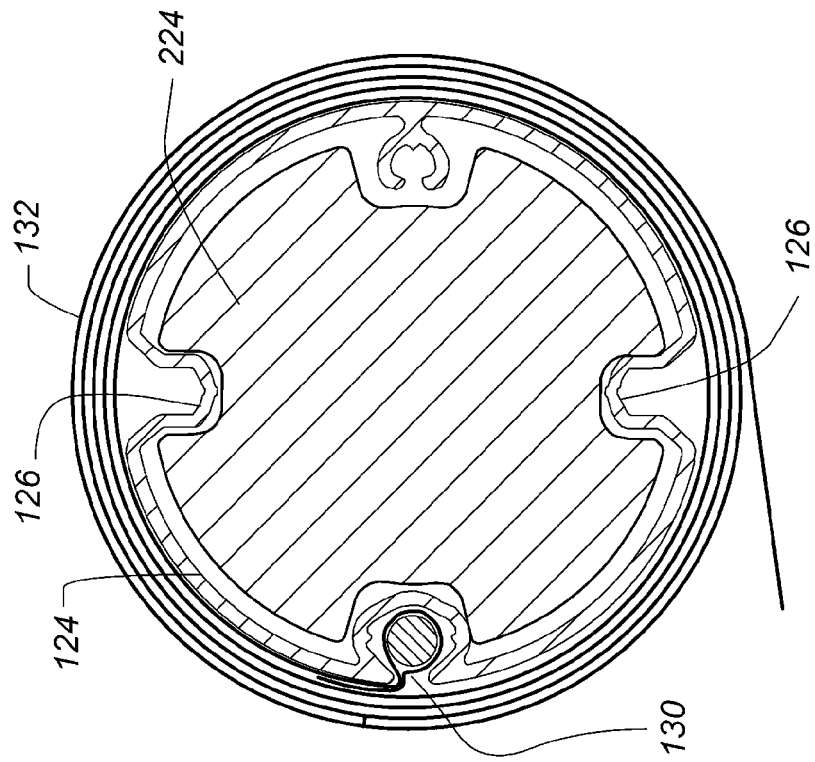
FIG. 24 is a cross-section view taken along the line 24-24 of FIG. 22 depicting the mounting configuration of a second end of the torsion spring.
Figure 23:
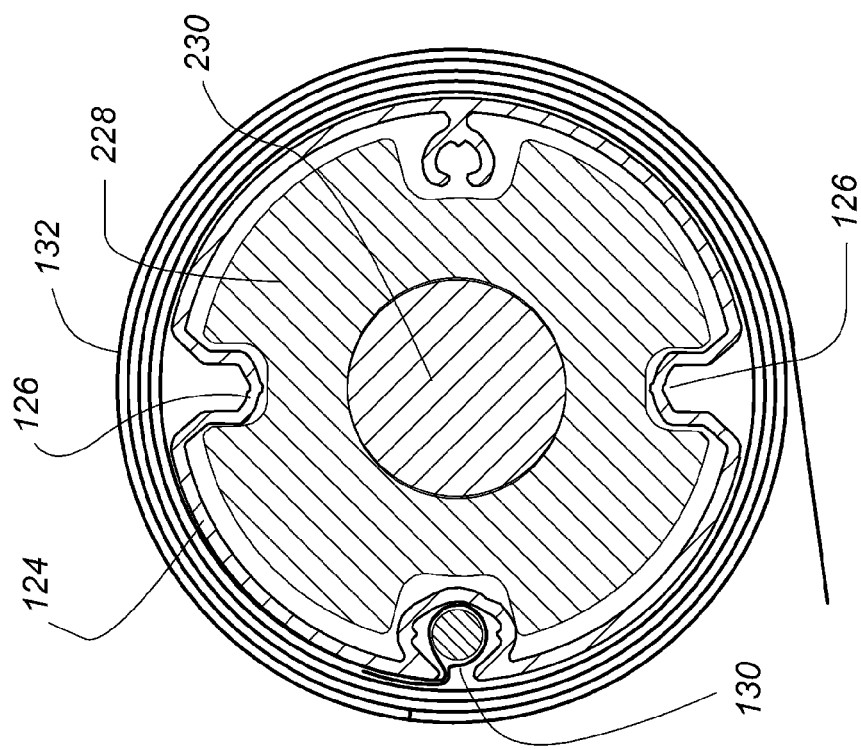
FIG. 23 is a cross-section view taken along the line 23-23 of FIG. 22 depicting the mounting configuration of a first end of the torsion spring.

An alternate embodiment of a manual override system for use in conjunction with an awning 112 and using the gravity ratchet 110 as previously described as a manual override mechanism is presented in FIGS. 22 through 24. As indicated previously, the gravity ratchet 110 is mounted on the drive shaft 150 of the tubular motor 148 and engages with the roll bar 124. In this implementation, a torsional spring 222 may also be mounted within the roll bar 124 adjacent the right end cap 118. The left or anterior end of the torsional spring 222 is fixedly mounted to the left base 226, which is further fixed to a left spring bracket 224 that is keyed to engage the longitudinal protrusions 126 of the roll bar 124 as indicated in the cross section of FIG. 24. In this manner the left end of the torsional spring 222 will rotate along with the rotation of the roll bar 124. The right end of the torsional spring 222 is mounted to a right base 230 that is rotationally mounted within a right spring bracket 228. The right spring bracket 228 is also keyed to engage the longitudinal protrusions 126 of the roll bar 124. The right base 230 extends through a rotational bearing aperture in the right spring bracket 228 to fixedly engage a lever member 232 that may be latched within the right end cap 118 of the housing (not shown). Thus the right hand side of the torsional spring 222 remains in a fixed position with respect to the roll bar 124 (i.e., the right end of the torsional spring 222 does not rotate) while the left end of the torsional spring 222 rotates as the roll bar 124 rotates.

As the roll bar moves in a clockwise direction from the perspective of the right end cap, the torsional spring 222 unwinds, similar in manner to the torsional spring supporting a garage door. Thus, as the roll bar 124 turns and unfurls the canopy 132, the torsional spring 222 moves from an equilibrium position when the awning 112 is closed to an extended and stressed position that wants to return to equilibrium. Note that the torsional spring 222 should be chosen to provide a light spring force that can be easily overcome by the motor 148 to unfurl the canopy 132 without significantly taxing the motor 148.

In the event of the failure of the motor 148, when the awning 112 is extended a user can manually override the locked drive shaft 150 by merely pushing against the lead bar 136 to overcome the force of the support arms 140. The torsional spring 222 provides some assistance in overcoming the force of the support arms 140, but in addition the torsional spring 222 is biased to untwist or recoil as the awning 112 is pushed in by the user, thereby rotating the roll bar 124 in a counterclockwise direction to draw in and furl the canopy around the roll bar 124. While the user is pushing the lead bar 136, the gravity ratchet 110 acts as described in FIGS. 17 and 18 to provide slippage for the roll bar 124 with respect to the drive shaft 150, thus allowing the user to furl the canopy 132 within the housing.

The force of the torsional spring 222 and its equilibrium position may be chosen to be sufficient enough to help counteract the opposing force of the support arms 140 that are biased to again unfurl the canopy 132 once the awning 112 is completely retracted. In addition the gravity ratchet 110 will also oppose the force of the support arms 140 wanting to rotate the roll bar 124 in a clockwise direction as shown in FIG. 15. Since the tubular motor 148 is inoperable, the drive shaft 150 will be immobile and will provide the necessary resistance force to prevent rotation of the roll bar 124 and prevent the awning 112 from extending.

It may also be appreciated that the mounting member 232 latched within the housing may also be used to manually furl the canopy 132 in the event of a malfunction of the motor 148. The mounting member 232 may be unlatched from any retaining structures in the right end cap 118. The user may then turn the mounting member 232 in a counterclockwise direction to begin reducing the stress on the torsional spring 222 and recoiling it to an equilibrium position. Initially this will have no effect upon retraction of the awning 112 as the force of the support arms 140 on the canopy 132 will prevent the roll bar 124 from rolling. However, once the torsional spring 222 returns to an equilibrium position, the user may keep turning the mounting member 232 in a counterclockwise direction until the spring is compacted and the rotational force on the mounting member 232. This force is translated through the torsional spring 222 to the left base 226 and left spring bracket 224 that further translate this force to the roll bar 124 and turn it to retract the awning 112.

While the implementations shown in the figures and described herein have been presented in the context of lateral arm box-type awnings in which the motor, the roll bar, and related housing components are mounted to a fixed surface (e.g., the sidewall or roof of a camper or motor home), the manual override system may similarly be implemented in a vertical arm awning system in which the motor, the roll bar, and related housing components are mounted to the outer, extending end of vertical support arms while the lead bar is instead fixed to a surface. In such an embodiment, the vertical support arms are also fixed to the surface (e.g., the sidewall of the camper or motor home) and may have accordion joints to contract against the surface and expand outward to extend the roll bar and motor and thus unfurl the canopy. Any of the one-way override mechanisms described herein may similarly be installed with respect to the roll bar, the motor, and the housing in a vertical arm awning system with the same effect allowing for a manual override of the motor to retract the awning against the structure on which the lead bar and the vertical extension arms are mounted.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A retractable awning comprising in combination
   a housing;
   a roll bar rotatably mounted in the housing;
   a reversible drive system secured to the housing and operably connected to the roll bar for selectively rotating the roll bar in opposite directions;
   a canopy secured along a first edge to the roll bar and adapted to be wrapped around the roll bar when the roll bar is rotated in a first direction to retract the awning and unwrapped from the roll bar when the roll bar is rotated in a second, opposite direction;
   a lead bar secured to a second edge of the canopy;
   extendable and retractable support arms connected to the housing;
   a biasing system operatively connected to the support arms to bias the support arms toward an extended position to separate the housing and the lead bar to unfurl the canopy;
   a torsion spring operably connected to the roll bar and configured to provide a force on the roll bar in the first direction; and
   an override mechanism that passively disengages the operable connection between the roll bar and the drive system when a manual retraction force is transferred to the roll bar;
   wherein when the drive system is disengaged and an external force is applied to the to the support arms opposing the biasing system to retract the support arms, the torsion spring rotates the roll bar to wrap the canopy around the roll bar.

2. The retractable awning of claim 1 further comprising an engagement structure connected to the roll bar and configured to receive a manually driven tool to manually rotate the roll bar in the first direction.

3. The retractable awning of claim 1, wherein the operable connection of the roll bar to the drive system further comprises
   a drive shaft driven by the drive system and connected to the roll bar; and
   one or more one-way bearings disposed on the drive shaft and between the drive shaft and the roll bar, wherein the one-way bearings function as the override mechanism.

4. The retractable awning of claim 1, wherein the operable connection of the roll bar to the drive system further comprises
   a drive shaft driven by the drive system and connected to the roll bar;
   one or more bearings disposed on the drive shaft and between the drive shaft and the roll bar; and
   a ratchet system disposed between the drive shaft and the roll bar, wherein
   the combination of the one or more bearings and the ratchet system function as the override mechanism.

5. The retractable awning of claim 4, wherein
   the drive shaft defines a plurality of teeth on an outer surface thereof; and
   the ratchet system comprises a pawl hinged with respect to the roll bar and interfaces with the teeth on the drive shaft to allow rotation of the roll bar about the drive shaft in only one direction.

6. The retractable awning of claim 1, wherein
   the drive system comprises a motor; and
   the operable connection of the roll bar to the motor further comprises
   a drive shaft driven by the motor and connected to the roll bar; and
   a ratchet system disposed between the drive shaft and the roll bar, wherein
   the ratchet system functions as the override mechanism.

7. The retractable awning of claim 6, wherein the ratchet system further comprises
   a hub that defines
      an outer perimeter surface composed of a plurality of curved surfaces that form one half of respective sliding bearing pockets, and
      a keyed passageway extending axially therethrough and configured to engage the drive shaft;
   a cap that defines a chamber bounded by an inner perimeter surface, wherein
      the inner perimeter surface is composed of a respective plurality of curved recesses corresponding to the plurality of curved surfaces; and
      the chamber rotatably receives the hub whereby a plurality of bearing pockets are formed by adjacent pairs of the plurality of curved surfaces and the plurality of curved recesses; and
   a plurality of bearings housed within respective ones of the plurality of bearing pockets, wherein
      as the hub is rotatably driven by the drive shaft, a subset of the plurality of bearings in a subset of the plurality of bearing pockets engage opposing curved surfaces and curved recesses to form a locking interface between the hub and the cap;
      the subset of the plurality of bearings engaging the opposing curved surfaces and curved recesses incrementally changes among the plurality of bearings and corresponding bearing pockets as the hub rotates; and
      alternatively as the cap is rotatably driven, none of the plurality of bearings engage opposing curved surfaces and curved recesses of the respective plurality of bearing pockets and the cap freely rotates about the hub.

8. The retractable awning of claim 7, wherein the bearings are cylindrical rollers.

9. The retractable awning of claim 7, wherein corresponding ones of the plurality of opposing curved surfaces and curved recesses forming the plurality of bearing pockets remain as constant pairs while the hub is driven.

10. The retractable awning of claim 7, wherein corresponding ones of the plurality of opposing curved surfaces and curved recesses forming the plurality of bearing pockets change pairings while the cap is driven.

11. The retractable awning of claim 2, wherein the engagement structure is configured to receive a ratchet wrench.

12. The retractable awning of claim 1, wherein the drive system is a tubular motor positioned axially within the roll bar.

13. The retractable awning of claim 12, wherein the tubular motor further comprises
- a bearing ring that interfaces with the roll bar;
- a counter mechanism responsive to rotation of the bearing ring; and
- a switch mechanism actuated by a value recorded by the counter mechanism to stop the tubular motor when the retractable awning is in a fully extended state and a fully retracted state; wherein
- the override mechanism maintains proper function of the bearing ring and the counter mechanism whereby the value is indicative of the fully retracted state when the retractable awning is moved to the fully retracted state by the manual retraction force.

14. The retractable awning of claim 1, wherein the torsion spring is fixedly mounted at a first end to the roll bar and fixedly mounted to the housing at a second end.

15. The retractable awning of claim 1, wherein the torsion spring is fixedly mounted at a first end to the roll bar, removably mounted to the housing at a second end, and selectively rotatable with respect to the roll bar at the second end.

16. A retractable awning comprising in combination
- a housing;
- a roll bar rotatably mounted in the housing;
- a reversible drive system secured to the housing and having a drive shaft extending therefrom;
- a canopy secured along a first edge to the roll bar and adapted to be wrapped around the roll bar when the roll bar is rotated in a first direction to retract the awning and unwrapped from the roll bar when the roll bar is rotated in a second, opposite direction;
- a lead bar secured to a second edge of the canopy;
- extendable and retractable support arms connected to the housing;
- a biasing system operatively connected to the support arms to bias the support arms toward an extended position to separate the housing and the lead bar to unfurl the canopy;
- a torsion spring operably connected to the roll bar and configured to provide a force on the roll bar in the first direction; and
- a ratchet system disposed between the drive shaft and the roll bar, wherein
  - the ratchet system operably connects the drive shaft to the roll bar for selectively rotating the roll bar; and
  - the ratchet system passively disengages the operable connection between the roll bar and the drive system when a manual retraction force is transferred to the roll bar
- wherein when the drive system is disengaged and an external force is applied to the to the support arms opposing the biasing system to retract the support arms, the torsion spring rotates the roll bar to wrap the canopy around the roll bar.

17. The retractable awning of claim 16 further comprising an engagement structure connected to the roll bar and configured to receive a manually driven tool to manually rotate the roll bar in the first direction.

18. The retractable awning of claim 16, wherein the engagement structure is configured to receive a ratchet wrench.

19. The retractable awning of claim 16, wherein the torsion spring is fixedly mounted at a first end to the roll bar and fixedly mounted to the housing at a second end.

20. The retractable awning of claim 19, wherein the second end of the torsion spring is removably mounted to the housing and is rotatable with respect to the roll bar.

21. The retractable awning of claim 16, wherein the ratchet system further comprises
- a hub that defines
  - an outer perimeter surface composed of a plurality of curved surfaces that form one half of respective sliding bearing pockets, and
  - a keyed passageway extending axially therethrough and configured to engage the drive shaft;
- a cap that defines a chamber bounded by an inner perimeter surface, wherein
  - the inner perimeter surface is composed of a respective plurality of curved recesses corresponding to the plurality of curved surfaces; and
  - the chamber rotatably receives the hub member whereby a plurality of bearing pockets are formed by adjacent pairs of the plurality of curved surfaces and the plurality of curved recesses; and
- a plurality of bearings housed within respective ones of the plurality of bearing pockets, wherein
- as the hub is rotatably driven by the drive shaft, a subset of the plurality of bearings in a subset of the plurality of bearing pockets engage opposing curved surfaces and curved recesses to form a locking interface between the hub and the cap;
- the subset of the plurality of bearings engaging the opposing curved surfaces and curved recesses incrementally changes among the plurality of bearings and corresponding bearing pockets as the hub rotates; and
- alternatively as the cap is rotatably driven, none of the plurality of bearings engage opposing curved surfaces and curved recesses of the respective plurality of bearing pockets and the cap freely rotates about the hub.

22. The retractable awning of claim 21, wherein corresponding ones of the plurality of opposing curved surfaces and curved recesses forming the plurality of bearing pockets remain as constant pairs while the hub is driven.

23. The retractable awning of claim 21, wherein corresponding ones of the plurality of opposing curved surfaces and curved recesses forming the plurality of bearing pockets change pairings while the cap is driven.

24. The retractable awning of claim 21, wherein the drive system is a tubular motor positioned axially within the roll bar.

25. The retractable awning of claim 24, wherein the tubular motor further comprises
- a bearing ring that interfaces with the roll bar;
- a counter mechanism responsive to rotation of the bearing ring; and a switch mechanism actuated by a value recorded by the counter mechanism to stop the tubular motor when the retractable awning is in a fully extended state and a fully retracted state; wherein the ratchet system maintains proper function of the bearing ring and the counter mechanism whereby the value is indicative of the fully retracted state when the retractable awning is moved to the fully retracted state by the manual retraction force.

26. The retractable awning of claim 21 further comprising an engagement structure connected to the roll bar and configured to receive a manually driven tool to manually rotate the roll bar in the first direction, the second, opposite direction, or both.

27. The retractable awning of claim 21, wherein the torsion spring is fixedly mounted at a first end to the roll bar and fixedly mounted to the housing at a second end.

28. The retractable awning of claim 21, wherein the torsion spring is fixedly mounted at a first end to the roll bar, removably mounted to the housing at a second end, and selectively rotatable with respect to the roll bar at the second end.

29. The retractable awning of claim 1, wherein the torsion spring is coupled to a spring bracket which is keyed to engage a feature inside the roll bar.

30. The retractable awning of claim 1, wherein an equilibrium position of the torsion spring is configured such that the torsion spring is at equilibrium when the canopy is completely wrapped around the roll bar.

31. The retractable awning of claim 1, wherein the override mechanism is mounted on the drive shaft of the drive system.

32. The retractable awning of claim 1, wherein the override mechanism bypasses the drive shaft when the external force is applied when the drive shaft is in a locked state.

33. The retractable awning of claim 1, wherein the manual force is the external force.

34. The retractable awning of claim 16, wherein the manual force is the external force.

\* \* \* \* \*